Figure 1:
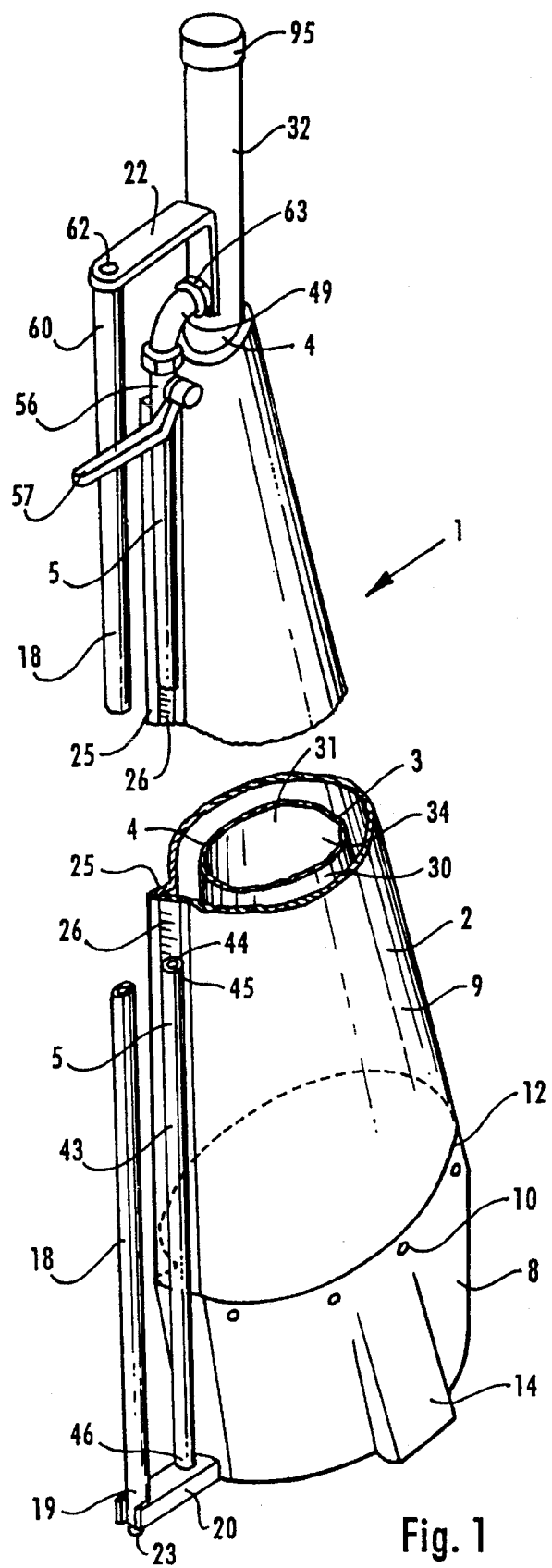

United States Patent [19]
Sisk et al.

[11] Patent Number: 5,606,109
[45] Date of Patent: Feb. 25, 1997

[54] LIQUID VOLUME MEASURING APPARATUS

[75] Inventors: Henry B. Sisk, Sallins; John J. Madden, Dublin; Niall A. O'Sullivan, Dublin; Kieran A. Comerford, Dublin; Oliver S. Hood, Dublin, all of Ireland

[73] Assignee: Burgee Limited, Cork, Ireland

[21] Appl. No.: 374,647

[22] PCT Filed: Jul. 30, 1993

[86] PCT No.: PCT/IE93/00043

§ 371 Date: May 16, 1995

§ 102(e) Date: May 16, 1995

[87] PCT Pub. No.: WO94/03781

PCT Pub. Date: Feb. 17, 1994

[30] Foreign Application Priority Data

Jul. 31, 1992 [IE] Ireland ................................. 92 2520
Apr. 1, 1993 [IE] Ireland ................................. S93 0259

[51] Int. Cl.[6] ................................................ G01F 25/00
[52] U.S. Cl. ................................................................ 73/3
[58] Field of Search ............................. 73/1 H, 3, 149, 73/426, 427, 429, 215, 332, 323

[56] References Cited

U.S. PATENT DOCUMENTS

| | | | |
|---|---|---|---|
| 1,075,025 | 10/1913 | Drautzburg | 73/323 |
| 1,377,577 | 5/1921 | Hanson. | |
| 1,460,873 | 7/1923 | Werbeck | 73/332 |
| 1,839,809 | 1/1932 | Smith. | |
| 2,696,738 | 12/1954 | Lupfer. | |
| 4,033,190 | 7/1977 | Hudspeth. | |
| 4,587,993 | 5/1986 | Hartl. | |
| 4,706,053 | 11/1987 | Giavarini. | |
| 4,928,514 | 5/1990 | Beaston. | |

FOREIGN PATENT DOCUMENTS

| | | |
|---|---|---|
| 0472363 | 8/1991 | European Pat. Off.. |
| 3306631 | 7/1984 | Germany. |
| 3940636 | 12/1989 | Germany. |
| 550390 | 4/1974 | Switzerland. |

*Primary Examiner*—Robert Raevis
*Attorney, Agent, or Firm*—Lowe, Price, LeBlanc & Becker

[57] ABSTRACT

Apparatus for determining deviation of a volume of liquid from a predetermined volume comprises a main vessel (4) for receiving the liquid and a measuring vessel (5) from which the deviation is determined from the meniscus of the liquid in the measuring vessel (5). A communicating tube (49) extending from a neck (32) of the main vessel (4) communicates the main vessel (4) with the secondary vessel (5) through a ball valve (56). Liquid above a weir (55) in the neck (32) flows into the measuring vessel (5). The deviation of the liquid volume is read from a scale (26) adjacent the measuring vessel (5). A variable volume bladder (71) completely filled with liquid alcohol is mounted in the main vessel (4) for compensating for volume changes in the main vessel (4) due to temperature variations.

11 Claims, 14 Drawing Sheets

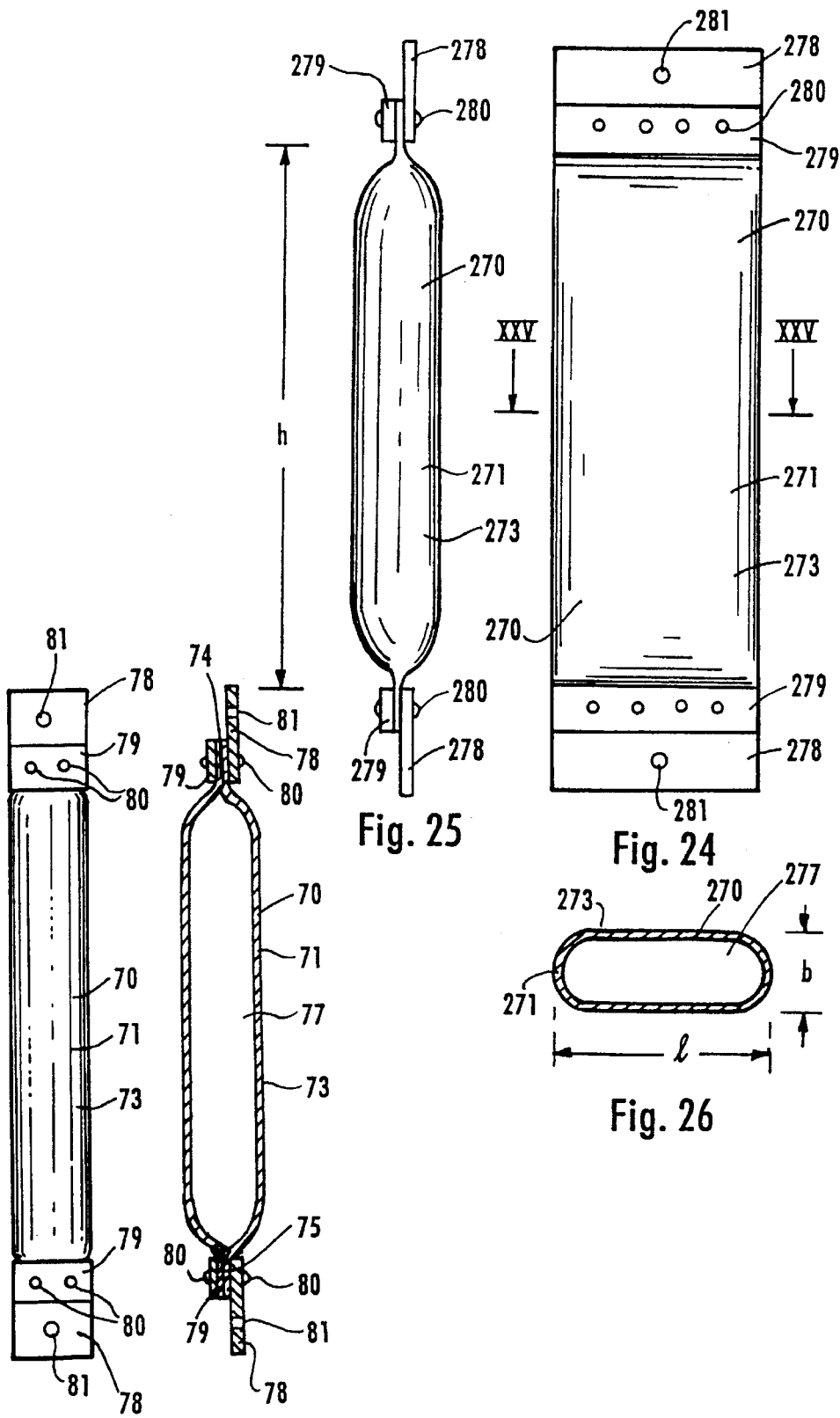

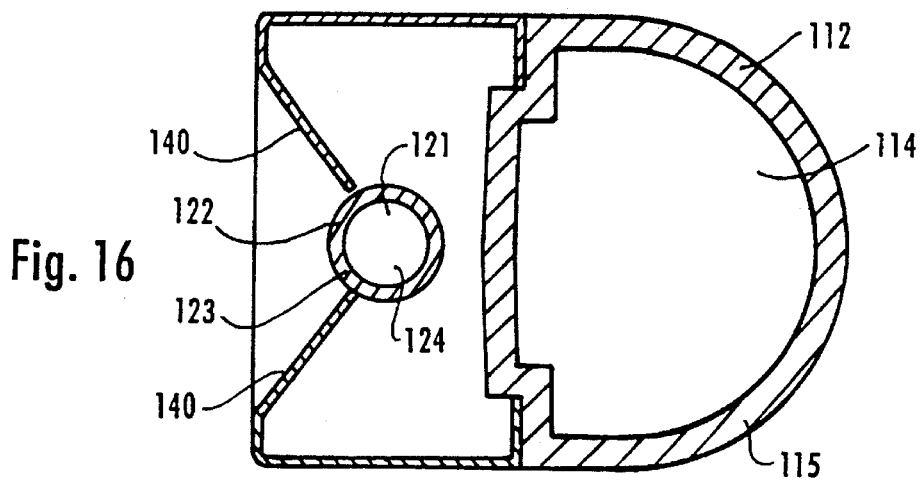
Fig. 16
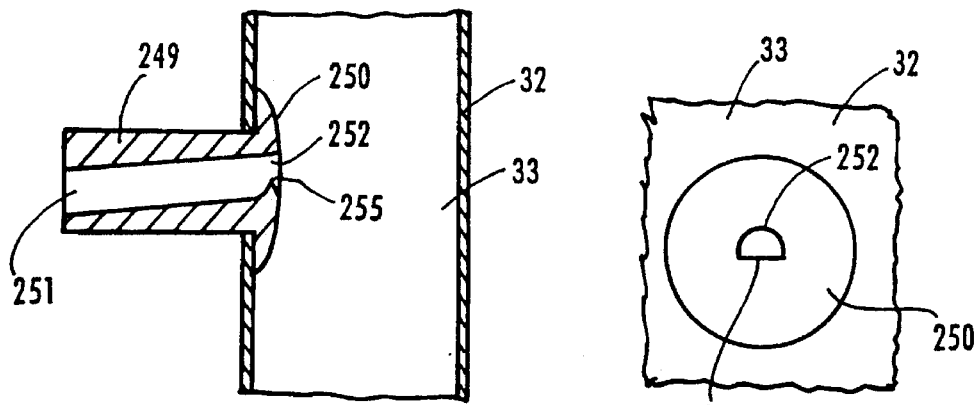
Fig. 22
Fig. 23
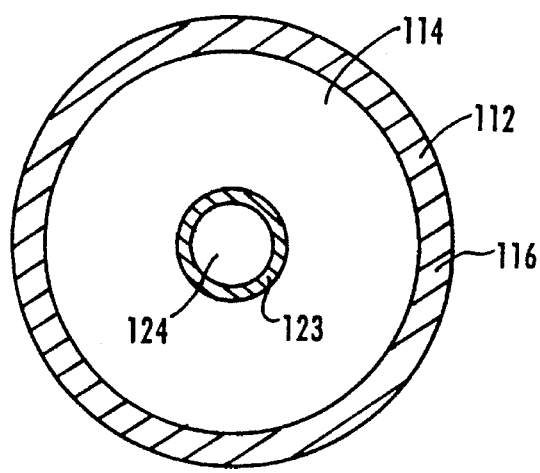
Fig. 15

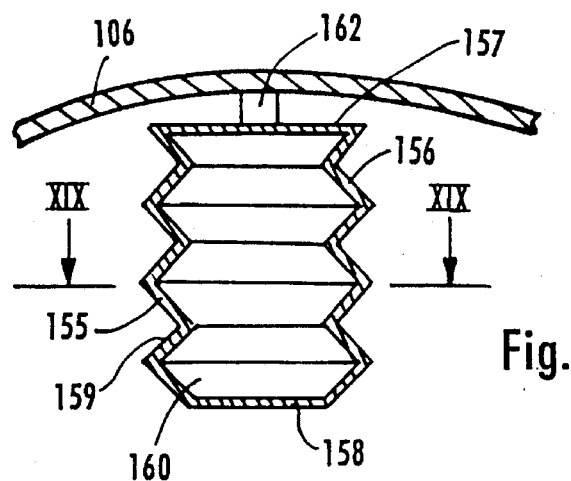
Fig. 18
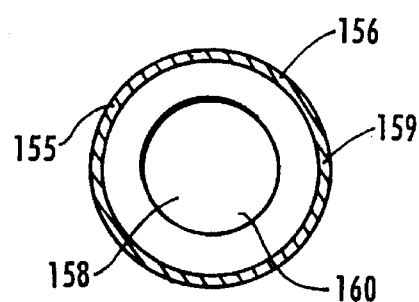
Fig. 19
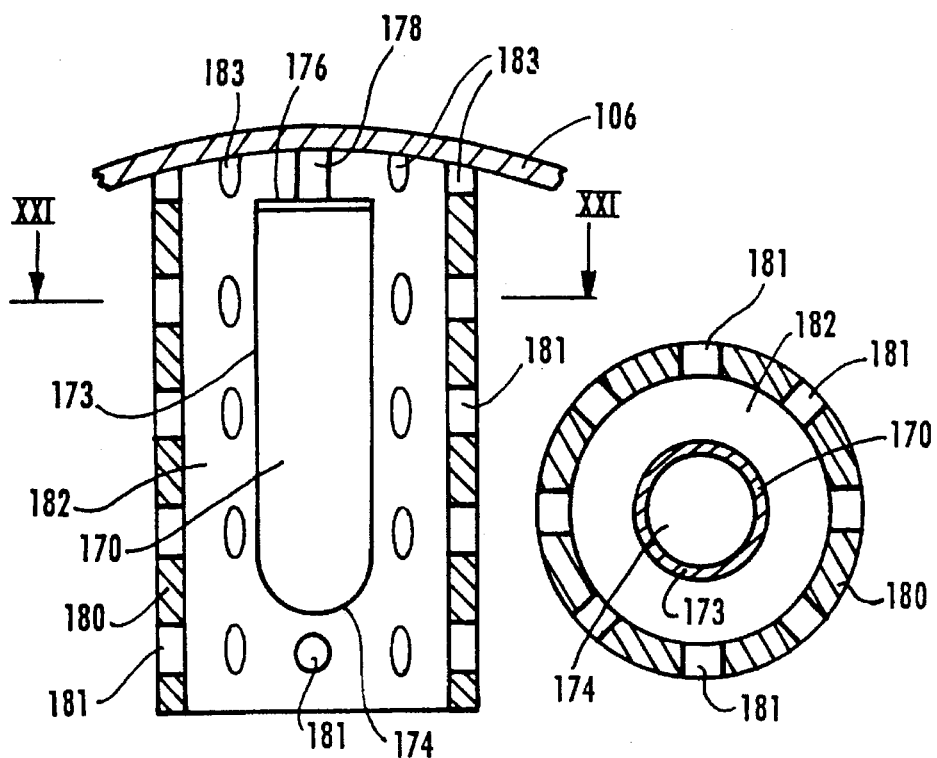
Fig. 20
Fig. 21

LIQUID VOLUME MEASURING APPARATUS

The present invention relates to apparatus for determining volume of a liquid, and in particular though not limited to apparatus for determining the deviation of a volume of liquid from a predetermined volume. The invention also relates to a vessel, the volume of which is substantially constant over a range of temperatures.

Apparatus for determining the deviation of a volume of liquid from a predetermined volume is typically used for checking the volumetric measuring accuracy of a dispensing and metering pump, such as, for example, the metering pump of a petrol pump of the type used in the forecourt of a service station. Such apparatus, in general, comprises one or more vessels of known volume. The quantity of liquid whose deviation from a predetermined volume is to be determined is delivered into one of the vessels. A suitable scale is provided for enabling the deviation in the volume of the liquid to be read. These known apparatus suffer from a number of disadvantages. In order to achieve the relatively high degree of accuracy required for determining the deviation of volume, known apparatus tend to require a relatively high degree of operator skill and have significant operational restrictions.

Furthermore, in general, such apparatus are calibrated at a predefined temperature, generally, 20° C. Where the apparatus is used at a temperature other than 20° C. during measuring of the volume of the liquid, the resultant volumes or deviations from a predetermined volume determined from the apparatus will be incorrect. In general, three main factors influence the temperature of the apparatus during measuring, firstly, the temperature of the ambient surrounds of the apparatus, secondly, and in many cases, more importantly, the temperature of the liquid being measured, and thirdly, the thermal response time of the apparatus. This thermal response time varies depending on the thermal conductivity of the material of the apparatus, in other words, the rate at which heat is transferred through the apparatus. For example, where the apparatus is to be used for determining the deviation of a volume of petrol from a predetermined volume, such apparatus, in general, are calibrated at 20° C. It is quite common for the petrol to be at a temperature anywhere from 5° C., and even lower to 20° C. and even higher. Thus, even where an apparatus is stored at a temperature of 20° C., on coming into contact with the petrol, the temperature of the apparatus will be reduced or increased depending on the temperature of the petrol, and this will affect the volume of the apparatus, and in turn the accuracy of the apparatus.

Typical of such apparatus for measuring the deviation in volume of a liquid from a predetermined volume, known heretofore are disclosed in U.S. Pat. Nos. 1,377,577 and 4,928,514. In both cases, the apparatus comprises a container which defines a relatively large hollow interior region for the liquid, and a neck extending upwardly from the container which defines a throat to the hollow interior region of the container. A scale which comprises plus and minus graduations, respectively, above and below a zero datum graduation is mounted in the neck, and enables the deviation of the volume of liquid from the predetermined volume to be measured. The level of the meniscus of the liquid in the throat is read from the scale, and this gives the deviation above or below the predetermined volume. Although, the transverse cross sectional area of the throat in both containers is somewhat less than the transverse cross sectional area of the hollow interior region of the container, it is still relatively large. The accuracy of the results obtained from these apparatus is relatively low. Firstly, because of the relatively large cross sectional area of the throat the vertical distance on the scale corresponding to a unit deviation in volume is relatively small. Thus, without considerable operator skill, inaccuracies may occur when reading the meniscus level from the scale. Secondly, because of the relatively large cross sectional area of the throat, an inaccurate reading of deviation will be obtained unless the container is level, in other words, unless the neck is extending in a vertical direction during measuring.

European Patent Specification No. 0,472,353A discloses an alternative construction of apparatus for determining the deviation of a volume of liquid from a predetermined volume. The apparatus disclosed in this European specification requires two separate vessels namely, an outer vessel into which the liquid is poured, and an inner vessel which is inserted into the outer vessel after the liquid has been poured into the outer vessel. An inlet to the inner vessel is provided at a predetermined height on the inner vessel, so that when the inner vessel is placed in the outer vessel, liquid flows into the inner vessel. A scale is provided along the inner vessel which enables one, on withdrawing the inner vessel, to read the deviation of the volume of liquid from a predetermined volume. This apparatus, since it requires two completely separate vessels, is cumbersome to use, and requires a significant level of operator skill. Furthermore, the apparatus is prone to considerable inaccuracy as a result of the fact that the accuracy of measuring largely depends on the accuracy with which the inner vessel is inserted into and positioned in the outer vessel. An alternative construction of this apparatus is also illustrated in the European specification. In the alternative construction, liquid is bled from the neck of a main vessel into a separate externally mounted graduated beaker from which the deviation is read. This apparatus suffers from substantially similar disadvantages as the other apparatus disclosed in this European specification. A further disadvantage of this alternative construction of apparatus is that in certain cases it may provide inaccurate results. This is particularly so in cases where the volume of liquid being measured is significantly less than the predetermined volume. In such cases the apparatus may indicate a deviation greater than the predetermined volume due to the fact that during delivery of the liquid into the apparatus some liquid may flow into the graduated beaker prior to the actual level of the liquid in the main vessel reaching a level in the neck at which flow should commence into the beaker. In such cases, if the liquid level subsequently does not reach the said level in the neck, the result will be inaccurate.

There is therefore a need for apparatus for determining the deviation of a volume of liquid from a predetermined volume which overcomes The problems of the known apparatus just discussed, and other known apparatus. There is also a need for apparatus for determining volume of a liquid which overcomes the problems of known apparatus. There is also a need for a vessel, the volume of which is substantially constant over a range of temperatures. It is an object of the invention to provide an apparatus for determining deviation of a volume of liquid from a predetermined volume which overcomes some or all of the problems of known apparatus. In particular, it is an object of the invention to provide apparatus for determining the deviation of a volume of liquid from a predetermined volume which is relatively accurate, relatively easy to use, and which requires the minimum of operator skills. It is also an object of the invention to provide such an apparatus which is largely unaffected by change or variation in temperature of the apparatus and/or temperature differential between the apparatus and the liquid the deviation of which is being measured. It is further an object of the invention to provide apparatus for determining the volume of a liquid which is relatively accurate, easy to use and may be used with minimum operator skills. It is also in object of the invention to provide apparatus for determining volume of liquid which is substantially unaffected by change or variation in temperature, and/or temperature differential between the apparatus and the liquid the volume of which is being determined. It is also an object of the invention to provide a vessel, the volume of which is substantially constant over a range of temperatures.

According to the invention, there is provided apparatus for determining volume of a liquid, the apparatus comprising a container having a hollow interior region for the liquid, and a scale means for determining the volume of liquid in the container, characterized in that a temperature compensating means is provided for maintaining the volume of a substantial portion of the hollow interior region of the container substantially constant over a range of temperatures, the temperature compensating means comprising a variable volume body member mounted in the hollow interior region, the variable volume body member being of a volume, and being of a material, the volumetric temperature co-efficient of expansion of which is such that the change in volume of the variable volume body member for each unit change in temperature is substantially similar to the change in volume of the hollow interior region of the container for each unit change in temperature.

The advantages of the invention are many. A particularly important advantage of the invention is that by virtue of the fact that temperature compensating means is provided the volume of the hollow interior region of the container remains substantially constant over a relatively large range of temperatures, and certainly over a range of temperatures in the range of −5° C. to −35° C. Thus, the apparatus is suitable for accurately determining the volume of a liquid or for accurately determining the volume of a deviation in the volume of a liquid from a predetermined volume irrespective of the temperature of the container and the temperature of the liquid. By virtue of the fact that the temperature compensating means comprises a variable volume body member, the volume and material of which, and the volumetric temperature co-efficient of expansion of which is such that the change in volume of the variable volume body member for each unit change in temperature is substantially similar to the change in volume of the hollow interior region of the container for each unit change in temperature, the volume of the hollow interior region of the container is substantially constant at all temperatures of the container, and the liquid, the volume of which or deviation in volume of which is being determined can be accurately determined irrespective of the temperature differential between the container and the liquid.

In another embodiment of the invention, the surface area of the variable volume body member is such as to optimize the surface area of the body member exposed in the hollow interior region of the container.

The advantage of this feature of the invention is that it provides a temperature compensating means with a relatively rapid temperature response time.

Preferably, the thermal response time of the variable volume body member is relatively closely matched to the thermal response time of the container which defines the hollow interior region.

The advantage of this feature of the invention is that there is little need to allow a settling time for the temperature of the liquid, the container and the variable volume body member to equalize.

In another embodiment of the invention, the variable volume body member defines a hollow interior region for containing a heat expandable fluid, the outer volume of the variable volume body member being responsive to change in volume of the heat expandable fluid.

The advantage of this feature of the invention is that it permits the use of a variable volume body member of relatively small volume relative to the volume of the hollow interior region of the container.

Preferably, the heat expandable fluid is a liquid. Advantageously, the heat expandable fluid is a liquid of relatively high volumetric temperature co-efficient of expansion. Preferably, the heat expandable fluid is liquid alcohol.

The advantage of using liquid alcohol is that it has a relatively high volumetric temperature co-efficient of expansion, and thus further contributes to allowing the volume of the variable volume body member to be kept relatively small relative to the volume of the hollow interior region of the container.

In one embodiment of the invention, the variable volume body member is of sheet material and comprises at least one wall adapted to accommodate change in the outer volume of the variable volume body member in response to change in volume of the heat expandable fluid so that the change in outer volume of the variable volume body member substantially corresponds to the free volumetric change in the volume of the heat expandable fluid contained therein in response to temperature change. The advantage of this feature of the invention is that the affect of temperature change on the variable volume body member may be substantially ignored.

In a further embodiment of the invention, the variable volume body member is of relatively thin wall construction. This further enables the effect of temperature on the body member to be substantially ignored.

Preferably, the variable volume body member is an elongated member extending between two ends.

The advantage of this feature of the invention is that it facilitates heat transfer throughout the variable volume body member, thus improving its temperature response time.

In another embodiment of the invention, the variable volume body member is anchored at one end to a wall of the container defining the hollow interior region. This is an advantageous construction of apparatus.

Preferably, the variable volume body member is anchored at both ends to a wall defining the hollow interior region of the container. This provides an advantageous construction of apparatus.

In one embodiment of the invention, the variable volume body member extends longitudinally between its ends and defines a substantially straight central axis. This feature of the invention provides a relatively convenient construction of apparatus.

In a further embodiment of the invention, the maximum transverse width of the variable volume body member is relatively narrow relative to its length.

The advantage of this feature of the invention is that it facilitates heat transfer throughout the variable volume body member, thus improving its temperature response time.

It is believed that it is preferable that the ratio of the maximum transverse width of the variable volume body member to the length of the body member should not exceed 50:1, and preferably, should not exceed 20:1, and advantageously, should be approximately 13:1.

In one embodiment of the invention, the variable volume body member is of ovoid or circular transverse cross section. The advantage of this feature of the invention is that it further improves the temperature response time of the variable volume body member.

Preferably, the variable volume body member is of hollow ovoid or circular transverse cross section.

Alternatively, the transverse cross section of the variable volume body member may be substantially rectangular, and preferably, where the cross section is rectangular, one dimension of the rectangular transverse cross section may be considerably greater than the other dimension perpendicular thereto. It is believed that an advantage of providing a variable volume body member of such a rectangular cross section would be that better heat conduction into the heat expandable fluid would be achieved. This would thus improve the temperature response time of the variable body member. This advantage would be achieved by virtue of the fact that a greater surface area per unit volume of the outer volume of the variable volume body member would be exposed in the main hollow interior region. Heat exchange ribs may also be provided on the outer surface of the variable volume body member for improving heat conduction into the body member, and in turn into the heat expandable fluid.

In one embodiment of the invention, the variable volume body member is of elastic material, and preferably, is of flexible, elastic material. Advantageously, the variable volume body member is of plastics material, preferably, a rubber or synthetic rubber material. The advantage of providing the variable volume body member of a flexible, and in particular an elastic material, is that provided the modulus of elasticity of the material is such the body member does not constrain the free volumetric expansion of the heat expandable fluid. Thus, the heat expandable fluid can expand and contract as though it were expanding and contracting in free air.

In another embodiment of the invention, the variable volume body member is of sheet metal material. The advantage of this feature of the invention is that it provides a relatively robust variable volume body member, and where the metal material of the variable volume body member is similar to the material of the container, the rate of heat transfer to the container and the variable volume body member and the heat expandable fluid contained therein is substantially similar, and accordingly, the rate of change of volume of the variable volume body member and the container should be substantially similar. Additionally, where the metal has relatively high heat conductivity characteristics, the heat transfer to the heat expandable fluid is relatively rapid, and accordingly, the temperature response time of the variable volume body member is short.

In one embodiment of the invention, the variable volume body member comprises an elongated side wall extending between a pair of end walls, and advantageously, the side wall is of concertina type construction. By providing such a side wall, the body member has little affect on the free expansion and contraction of the heat expandable fluid.

Preferably, a protective sleeve extends around and spaced apart from the variable volume body member for protection thereof.

In another embodiment of the invention, the container comprises a main vessel having a main hollow interior region for the liquid, and a measuring vessel having a secondary hollow interior region of transverse cross sectional area smaller than the maximum transverse cross sectional area of the main hollow interior region, the measuring vessel communicating with the main vessel through a communicating means for receiving liquid from the main vessel, the communicating means defining a weir means over which liquid passes from the main hollow interior region to the secondary hollow interior region, the weir means being positioned to retain a known volume of liquid in the main hollow interior region, the scale means being associated with the measuring vessel, and the temperature compensating means being provided in the main hollow interior region for maintaining the volume of the main hollow interior region substantially constant over the range of temperatures.

The advantage of having a main vessel and a measuring vessel is that considerably improved accuracy in reading the volume or deviation in volume from the apparatus is achieved. By virtue of the fact that the secondary hollow interior region is of transverse cross sectional area smaller than the maximum transverse cross sectional area of the main hollow interior region, the difference in height of the meniscus of the liquid in the secondary hollow interior region for each unit change in volume of liquid in the apparatus is considerably increased. An additional advantage of providing the apparatus with a main vessel and a measuring vessel is that the two vessels may be of different material, for example the main vessel may be of a relatively strong, robust material, for example, steel, stainless steel or the like, while the measuring vessel may be of a transparent material, such as, for example, glass, plastics material or the like.

In one embodiment of the invention, the main vessel comprises a main bulb defining a first hollow interior region and an elongated neck extending from the main bulb and defining an elongated throat communicating with the first hollow interior region, the first hollow interior region and the throat forming the main hollow interior region, the communicating means communicating with the throat. This provides a relatively convenient construction of apparatus.

Preferably, the transverse cross sectional area of the throat adjacent the communicating means is considerably smaller than the maximum transverse cross sectional area of the first hollow interior region. The advantage of this feature of the invention is that it improves the accuracy of the apparatus, and in particular, it improves the accuracy of use of the apparatus, in that it is not as critical that the apparatus should be level during use, in other words, it is not as critical that the neck should extend vertically upwardly.

It is believed preferable that the ratio of the maximum transverse cross sectional area of the first hollow interior region to the transverse cross sectional area of the throat adjacent the communicating means is at least 5:1, preferably, the ratio should be at least 10:1, and advantageously, the ratio should be approximately 20:1.

In one embodiment of the invention, the measuring vessel comprises an elongated tubular member defining a longitudinally extending bore of substantially constant transverse cross sectional area which forms the secondary hollow interior region. The advantage of this feature of the invention is that it provides a relatively accurate apparatus, and furthermore, an apparatus that can readily easily be used with minimum operator skills, and from which the volume or deviation in volume of the liquid can readily easily be read from the scale means.

It is believed preferable that the ratio of the maximum transverse cross sectional area of the first hollow interior region to the transverse cross sectional area of the secondary hollow interior region is at least 50:1, and preferably, should be at least 100:1, and advantageously, should be at least 200:1.

Advantageously, the tubular member of the measuring vessel is of transparent material to facilitate viewing of the meniscus of the liquid in the measuring vessel.

In one embodiment of the invention, the scale means is provided adjacent the tubular member of the measuring vessel. This facilitates ease of reading of the level of the meniscus in the measuring vessel.

Advantageously, the scale means is adjustably mounted to facilitate calibration of the apparatus.

In one embodiment of the invention, the communicating means comprises a communicating tube extending between the measuring vessel and the neck. This provides a convenient and accurate construction of apparatus. Preferably, the communicating tube extends into the throat, and preferably, the communicating tube terminates in a communicating opening in the throat.

The advantage of this feature of the invention is that it provides a particularly accurate apparatus. This is particularly so where the transverse cross sectional area of the throat is less than the maximum transverse cross sectional area of the hollow interior region. In such cases, since the liquid is being drawn from the main hollow interior region into the secondary hollow interior region through the communicating opening in the throat, it is not as critical that the apparatus be level during use, in other words, it is not as critical that the neck should extend vertically upwardly. Any minor deviation from level will not affect the result and reading obtained from the apparatus to any significant extent. Needless to say, the smaller the transverse cross sectional area of the throat relative to the maximum transverse cross sectional area of the main hollow interior region, the less critical it is that the apparatus be level during use.

In another embodiment of the invention, at least a portion of the communicating opening forms the weir means.

The advantage of this feature of the invention is that it provides a convenient construction, as well as a robust construction of apparatus, and in certain cases facilitates calibration of the apparatus.

In another embodiment of the invention, the communicating opening lies in a substantially vertical plane. Alternatively, the communicating opening lies in a substantially horizontal plane.

In one embodiment of the invention, the communicating opening lies adjacent the geometrical center of the throat. This provides a particularly advantageous apparatus, in that the apparatus is relatively accurate, and is virtually unaffected by the positioning of the apparatus in use. In other words, whether the apparatus is level or not during use has virtually no affect on the accuracy of the resultant reading obtained from the apparatus.

In another embodiment of the invention, inhibiting means is provided for selectively preventing passage of liquid into the secondary hollow interior region of the measuring vessel. The advantage of providing the inhibiting means is that there is no danger of liquid inadvertently splashing into the measuring vessel during filling of the apparatus with the liquid. It will be appreciated that should liquid splash into the measuring vessel during filling, this could lead to an inaccurate result in cases where the deviation in the volume of liquid below the predetermined level was greater than the maximum negative deviation to which the apparatus is provided to measure.

In one embodiment of the invention, the inhibiting means comprises a valve means, the valve means being operable between a closed position isolating the secondary hollow interior region from the main hollow interior region for inhibiting flow of liquid into the secondary hollow interior region and an open position communicating the main and secondary hollow interior regions. This provides a relatively convenient and robust construction of apparatus. Preferably, operating means is provided for operating the inhibiting means. Advantageously, the operating means is provided exteriorly of the apparatus. Preferably, the operating means is manually operable.

In another embodiment of the invention, the inhibiting means is provided downstream of the weir means, but adjacent thereto. In cases where the inhibiting means is provided downstream of the weir means, it is important that the inhibiting means should be located relatively close to the weir means to avoid the danger of any excessive quantities of liquid accumulating between the inhibiting means and the weir means as a result of splashing during filling of the apparatus. Any such accumulation of liquid, as discussed above, could lead to an inaccurate result being obtained in cases where the volume of liquid fell below the predetermined volume to an extent greater than the maximum negative deviation for which the apparatus is provided to determine. However, in many cases, relatively minor accumulations of liquid between the weir means and the inhibiting means would not have a serious adverse effect on the results obtained from the apparatus, and in general, would not have any effect on the results obtained from the apparatus where the volume of the liquid being measured exceeded the volume of the main hollow interior region up to the weir means.

Alternatively, the valve means is mounted in the communicating opening. The advantage of this feature of the invention is that there is little or no danger of any liquid accumulating during filling which could adversely affect the accuracy of the resultant reading obtained from the apparatus.

In one embodiment of the invention, main adjusting means is provided for varying the volume of the main hollow interior region up to the level of the weir means for calibration of the apparatus. The advantage of this feature of the invention is that it provides for relatively easy and straightforward calibration of the apparatus.

In one embodiment of the invention, the main adjusting means comprises means for varying the height of the weir means in the throat. It is also envisaged that a main adjusting means may be provided which would comprise a piston or other member movable into and out of the main hollow interior region for varying the volume of the main hollow interior region during calibration.

In another embodiment of the invention, secondary adjusting means is provided for varying the volume of the secondary hollow interior region for calibration of the apparatus. Preferably, the secondary adjusting means comprises a piston slidable in the measuring vessel for varying the volume of the secondary hollow interior region.

In one embodiment of the invention, the scale means comprises a scale for determining the volume of liquid in the apparatus from the level of the meniscus of the liquid in the measuring vessel.

In another embodiment of the invention, the scale means comprises a scale for determining the deviation of the volume of liquid being measured from a predetermined volume.

Additionally, the invention provides apparatus for determining volume of a liquid, the apparatus comprising a main vessel having a main hollow interior region for the liquid, a measuring vessel having a secondary hollow interior region of transverse cross-sectional area smaller than the maximum transverse cross-sectional area of the main hollow interior region, the measuring vessel communicating with the main vessel through a communicating means for receiving liquid from the main vessel, the communicating means defining a weir means over which liquid passes from the main hollow interior region to the secondary hollow interior region, the weir means being positioned to retain a predetermined volume of liquid in the main hollow interior region, and scale means being provided for determining the volume of liquid in the apparatus, characterized in that inhibiting means is provided for selectively preventing passage of liquid into the secondary hollow interior region of the measuring vessel.

The advantage of this aspect of the invention is that it provides relatively accurate apparatus which can be used by an operator with minimal operator skills, and which at the same time can produce relatively accurate results.

In one embodiment of the invention, the inhibiting means comprises a valve means, the valve means being operable between a closed position isolating the secondary hollow interior region from the main hollow interior region for preventing flow of liquid into the secondary hollow interior region, and an open position communicating the main and secondary hollow interior regions. Preferably, operating means is provided for operating the valve means. Advantageously, the operating means extends externally of the apparatus. Preferably, the operating means is manually operable.

In one embodiment of the invention, the main vessel comprises a main bulb defining a first hollow interior region and an elongated neck extending from the main bulb and defining an elongated throat communicating with the first hollow interior region, the first hollow interior region and the throat forming the main hollow interior region, the communicating means communicating with the throat. Advantageously, the communicating means defines a communicating opening.

Preferably, the communicating opening defines the weir means.

In one embodiment of the invention, the communion-ting opening lies in a substantially vertical plane. Preferably, the communicating opening lies in a substantiaily horizontal plane.

in another embodiment of the invention, the communicating opening is in the throat Preferably the communication opening lies adjacent the geometrical center of the throat. In another embodiment of the invention, the communicating means comprises a communicating tube extending between the measuring vessel and the neck. Preferably, the communicating tube extends into the throat.

In another embodiment of the invention, the weir means is provided in the main vessel. Preferably, the weir means is provided in the throat.

In a further embodiment of the invention, the inhibiting means is mounted in the communicating opening. Preferably, the valve means comprises a valving member co-operable with the communicating opening for closure thereof.

In one embodiment of the invention, the inhibiting means prevents passage of liquid into the secondary hollow interior region until the liquid level in the main hollow interior region at least reaches the level of the weir means.

Figure 2:
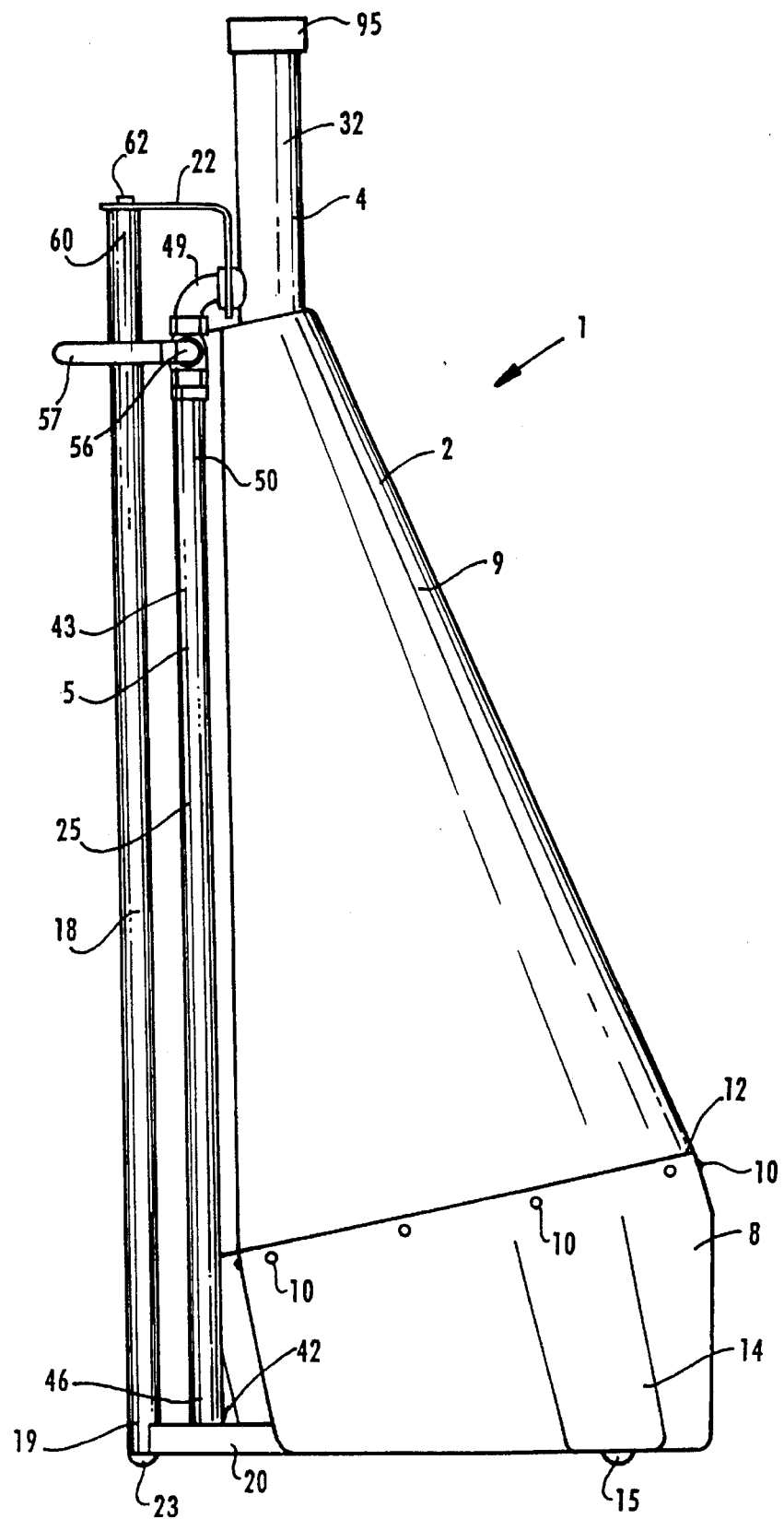
Figure 3:
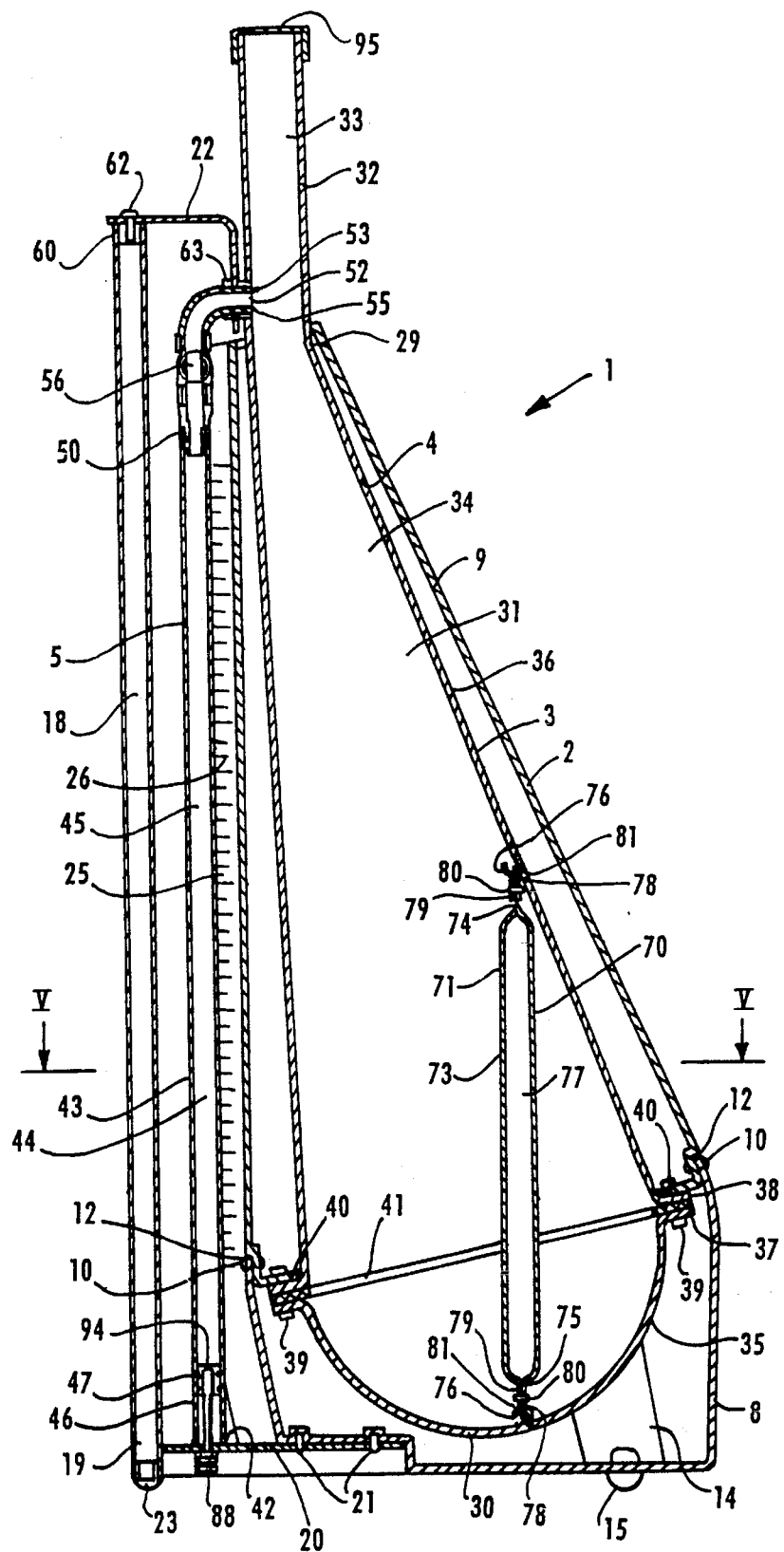
Figure 4:
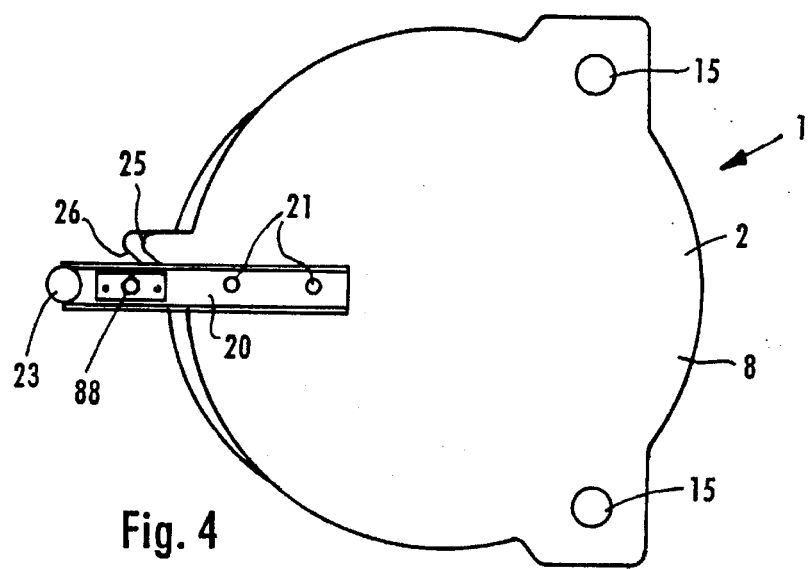
Figure 5:
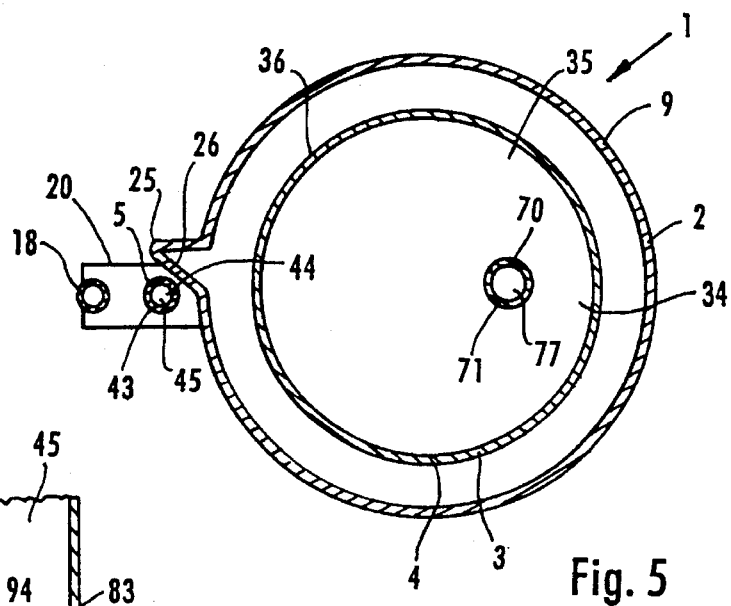
Figure 7:
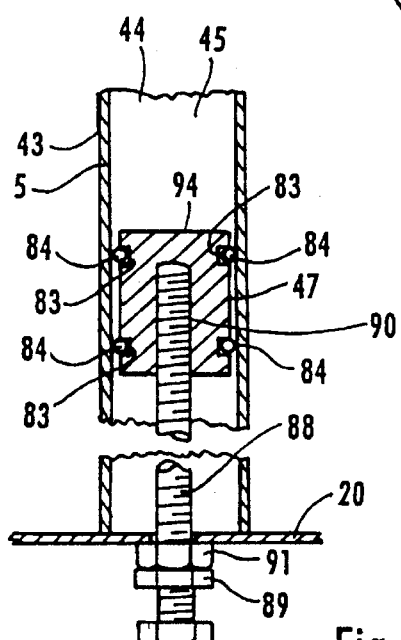
Figure 6:
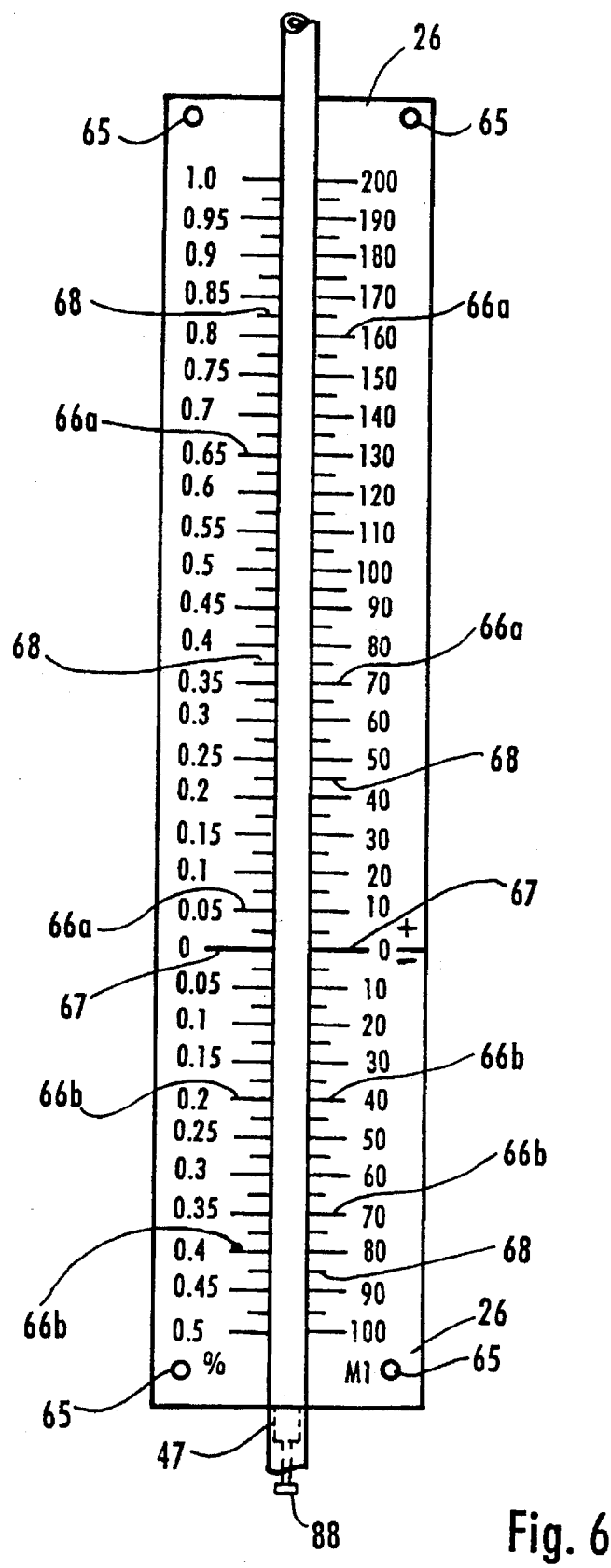
Figure 10:
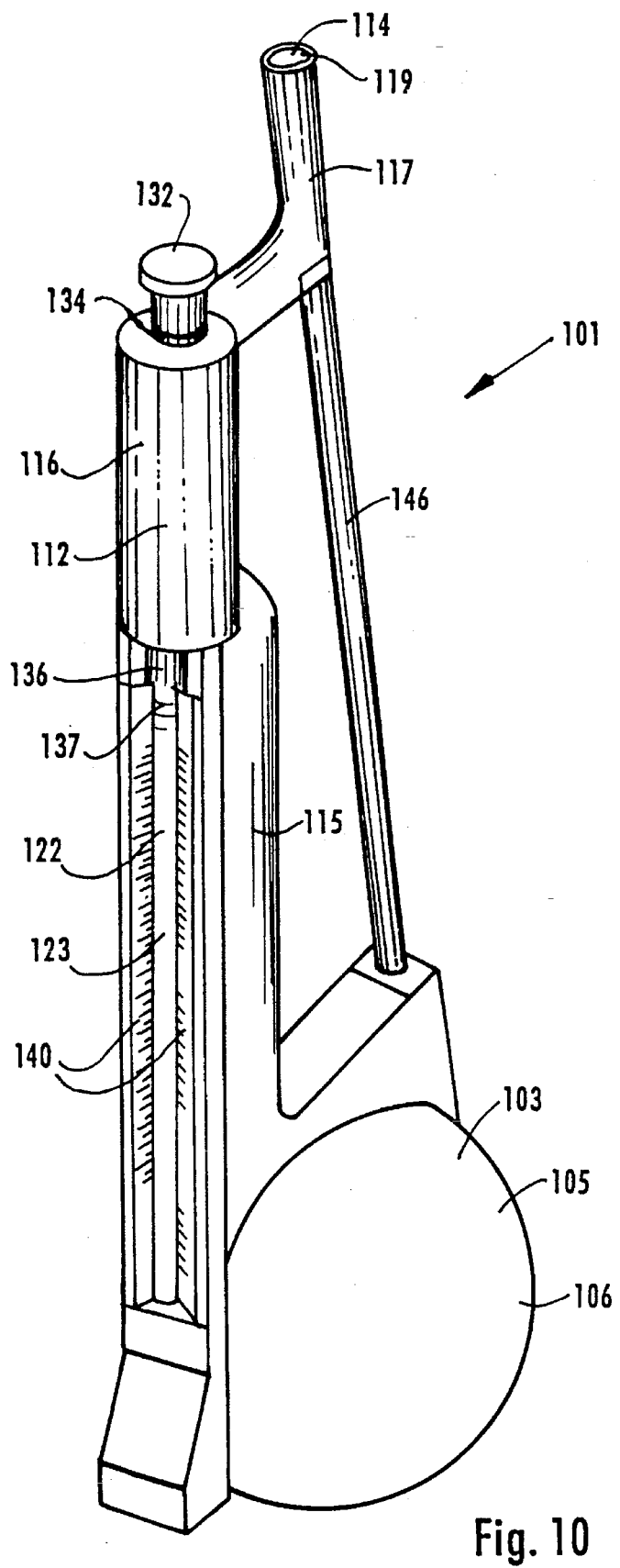
Figure 11:
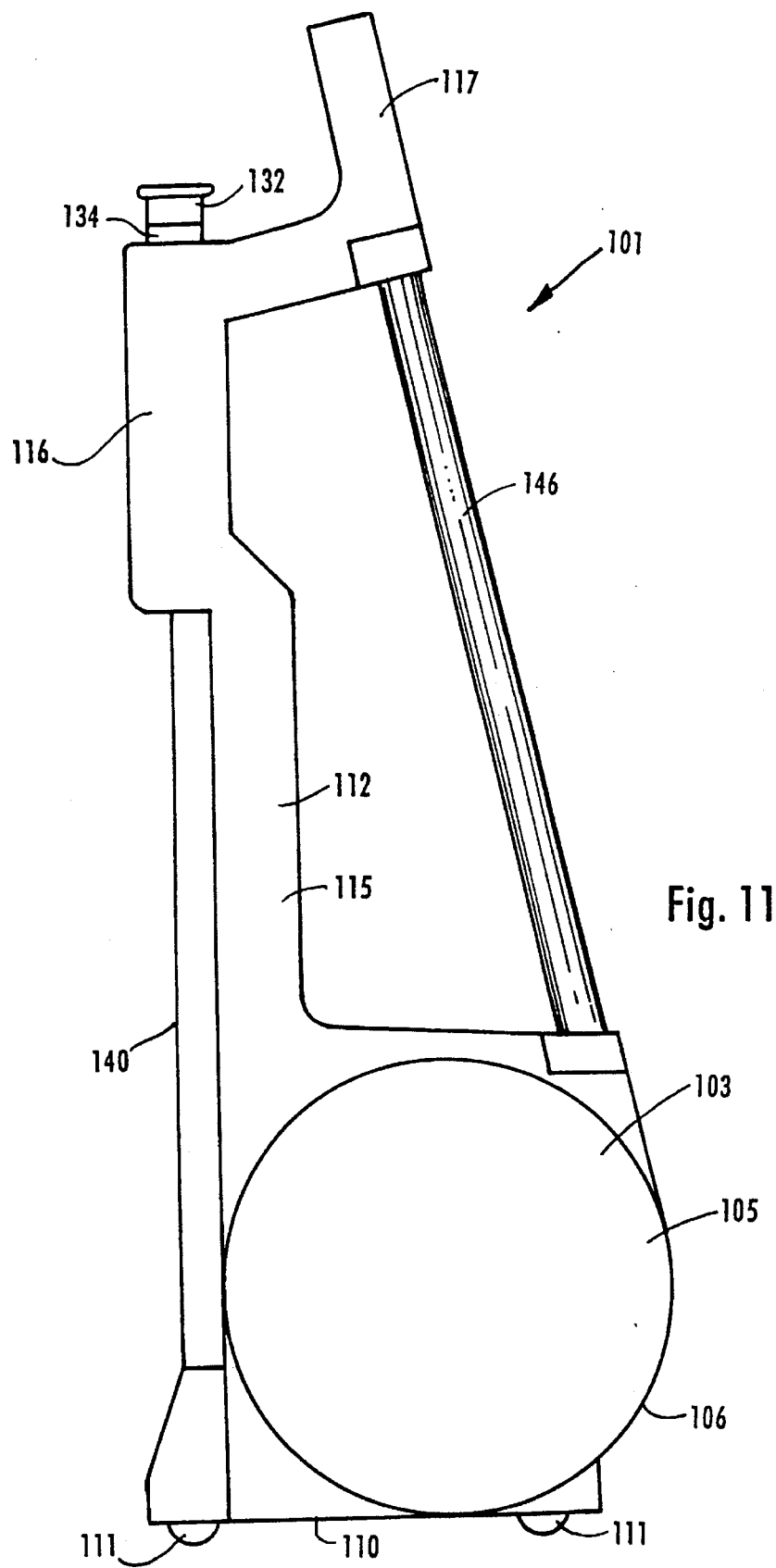
Figure 12:
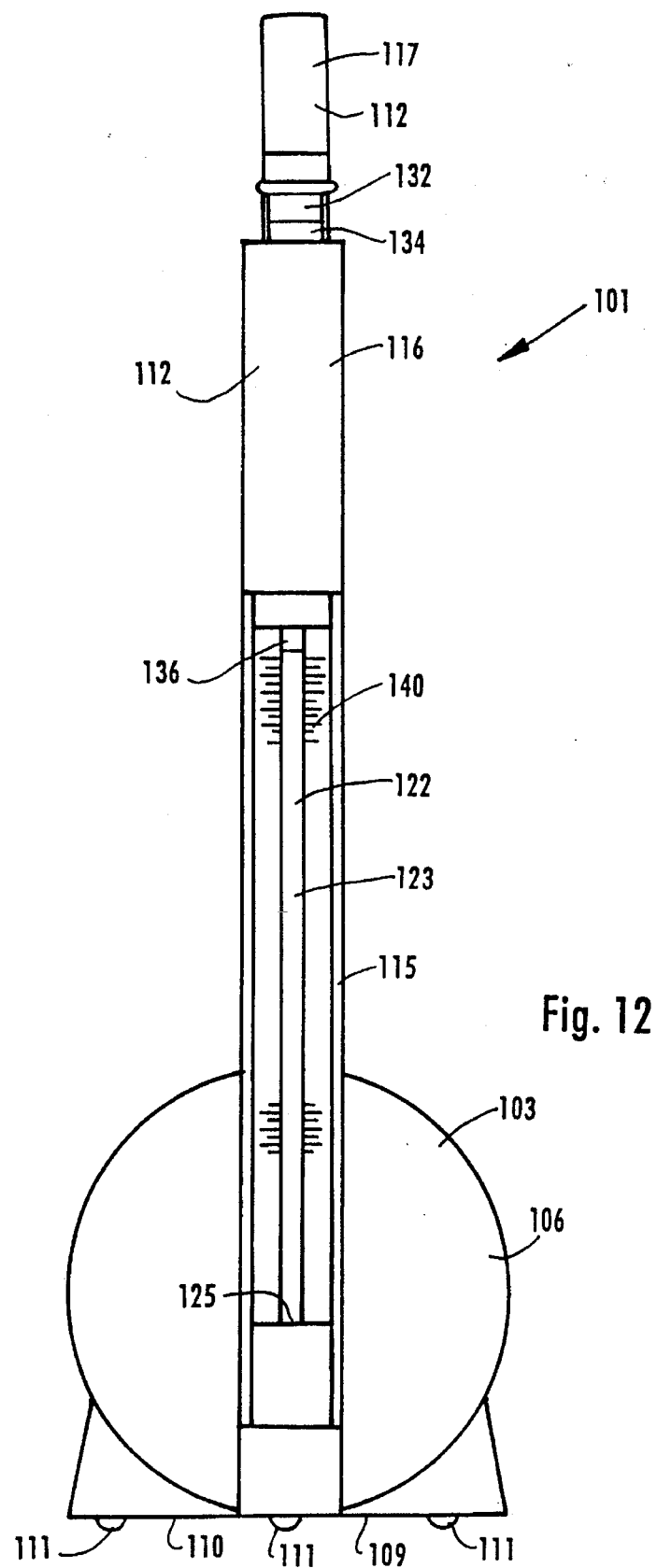
Figure 13:
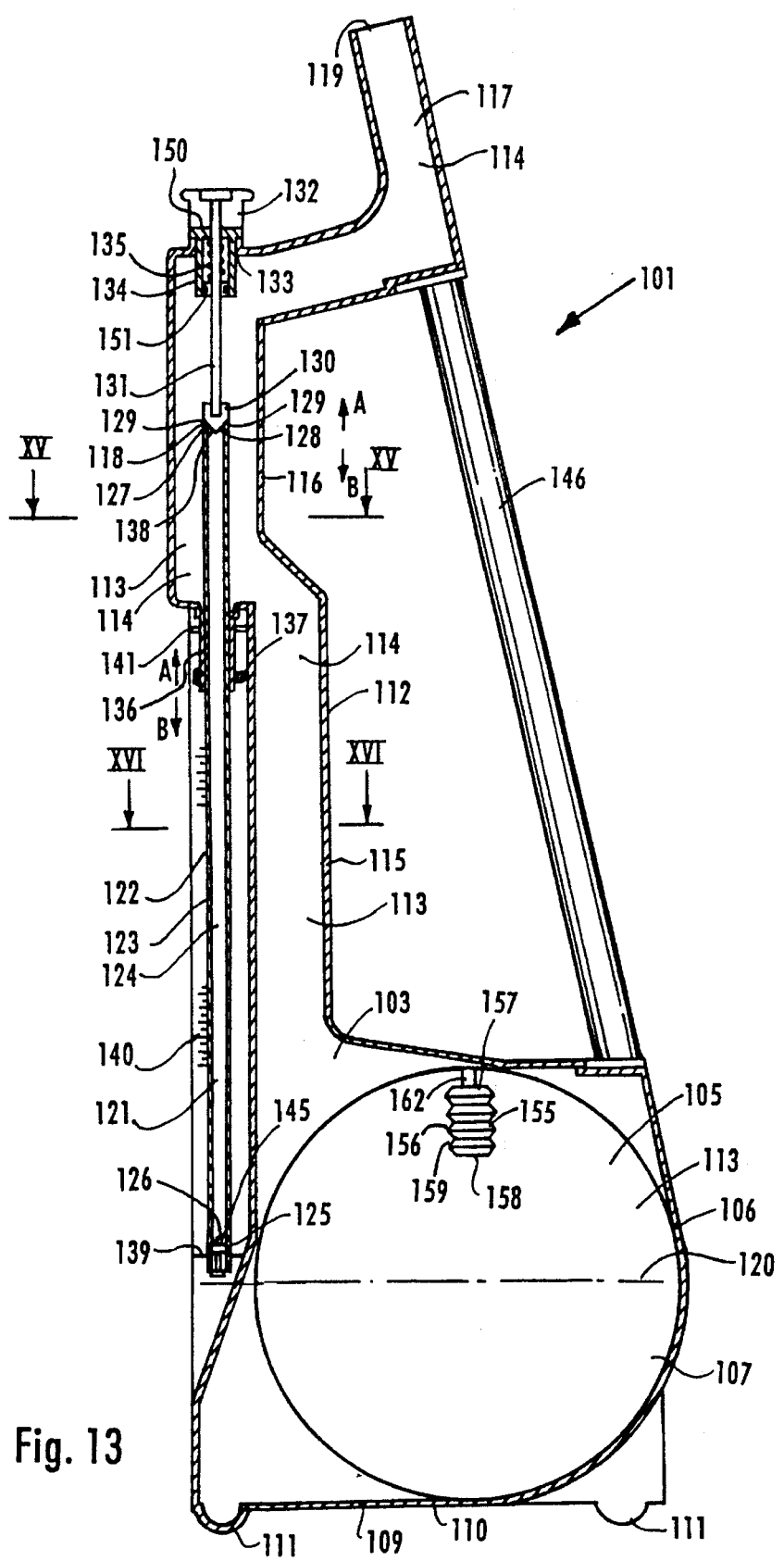
Figure 14:
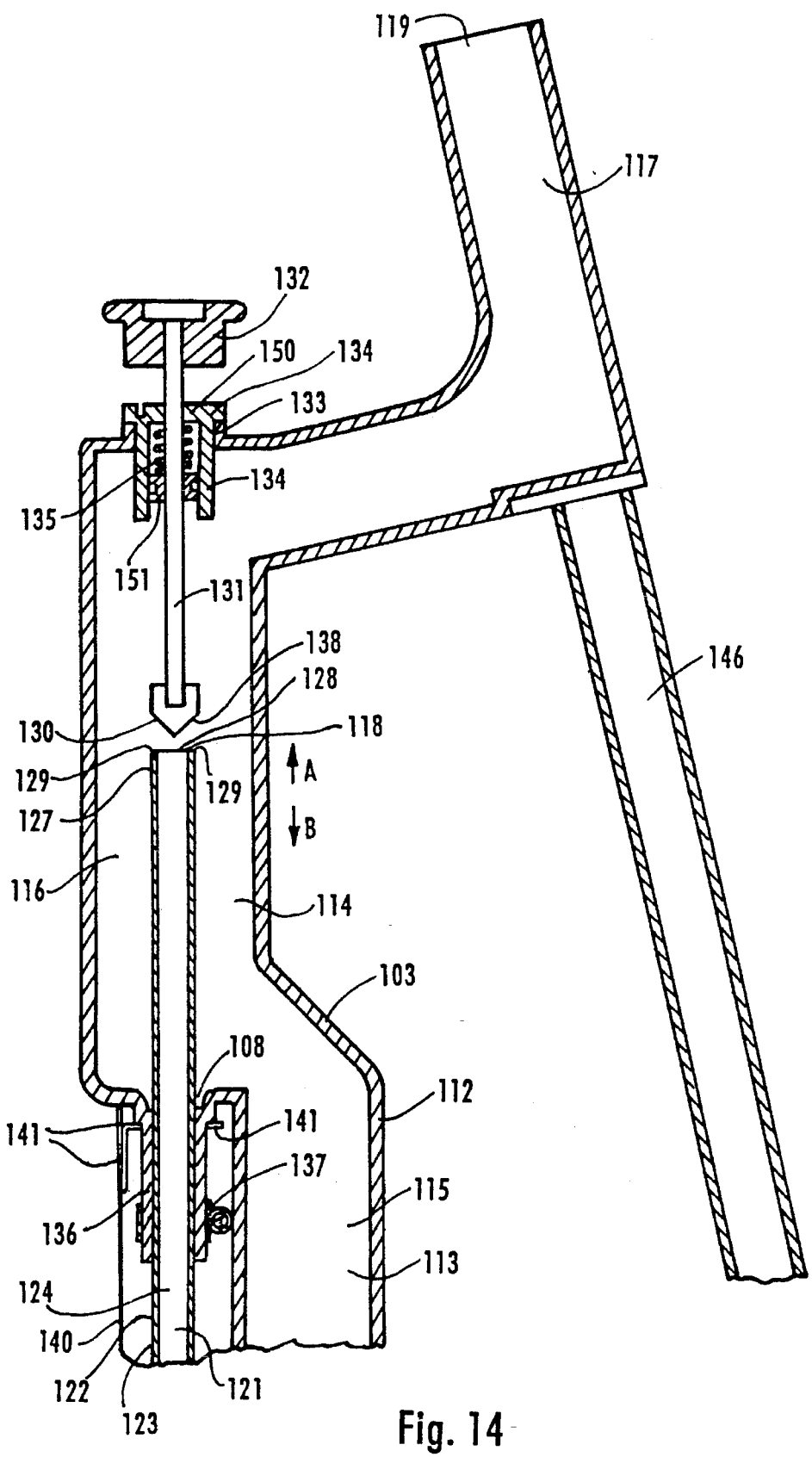
Figure 17:
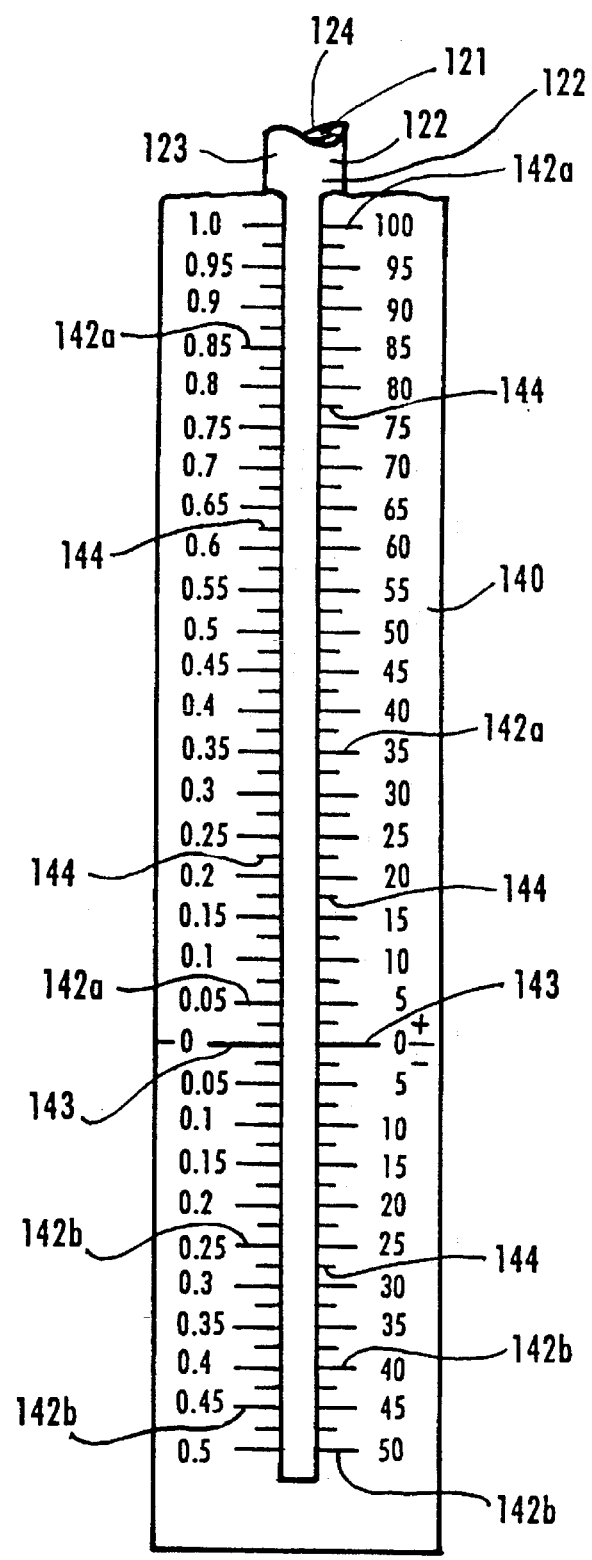

The invention will be more clearly understood from the following description of some preferred embodiments thereof, which are given by way of example only, with reference to the accompanying drawings, in which:

FIG. 1 is a perspective view of apparatus according to the invention for determining the deviation of a volume of liquid from a predetermined volume, FIG. 2 is a side elevational view of the apparatus of FIG. 1, FIG. 3 s a cross sectional side elevational view of the apparatus of FIG. 1, FIG. 4 s an underneath plan view of the apparatus of FIG. 1, FIG. 5 is a cross sectional plan view of the apparatus of FIG. 1 on the line V—V of FIG. 3, FIG. 6 is an elevational view of a detail of the apparatus of FIG. 1, not quite to scale, FIG. 7 s a cross sectional view of another detail of the apparatus of FIG. 1, FIG. 8 is a cross sectional side elevational view of a further detail of the apparatus of FIG. 1, FIG. 9 is a front elevational view of the detail of FIG. 8, FIG. 10 is a perspective view of apparatus according to another embodiment of the invention for determining the deviation of a volume of liquid from a predetermined volume, FIG. 11 is a side elevational view of the apparatus of FIG. 10, FIG. 12 is a front elevational view of the apparatus of FIG. 10, FIG. 13 is a cross sectional side elevational view of the apparatus of FIG. 10, FIG. 14 is a cross sectional side elevational view of a detail of the apparatus of FIG. 10, FIG. 15 is a cross sectional plan view of portion of the apparatus of FIG. 10 on the line XV—XV of FIG. 13, FIG. 16 is a cross sectional plan view of another portion of the apparatus of FIG. 10 on the line XVI—XVI of FIG. 13, FIG. 17 is a front elevational view of a detail of the apparatus of FIG. 10, FIG. 18 is a cross sectional side elevational view of another detail of the apparatus of FIG. 10, FIG. 19 is a plan view of the detail of FIG. 18 on the line IXX—IXX of FIG. 18, FIG. 20 is a cross sectional side view of a detail corresponding to the detail of FIG. 18 for use in apparatus according to another embodiment of the invention, FIG. 21 is a cross sectional plan view on the line XXI—XXI of FIG. 20, FIG. 22 is a cross sectional side elevational view of a detail of portion of an apparatus according to another embodiment of the invention, FIG. 23 is an end elevational view of the detail of FIG. 22, FIG. 24 is a front elevational view of another detail for use in apparatus according to a still further embodiment of the invention, FIG. 25 is a side elevational view of the detail of FIG. 24, and FIG. 26 is a cross sectional view of the detail of FIG. 24 on the line XXV—XXV of FIG. 23.

Referring to the drawings, and initially to FIGS. 1 to 9, there is illustrated apparatus according to the invention indicated generally by the reference numeral 1 for determining volume of liquid. The apparatus 1 in this embodiment of the invention is particularly suitable for determining the deviation of a volume of liquid from a predetermined volume, and is suitable for use in determining the volumetric metering accuracy of a metering pump, such as, for example, a petrol pump of the type normally found in the forecourt of a service station. The apparatus 1 comprises a support housing 2 for supporting a container 3 for the liquid. The container 3 comprises a main vessel 4 mounted substantially within the support housing 2 and a measuring vessel 5 communicating with the main vessel 4 and extending externally of the support housing 2 from which the deviation in volume of the liquid being measured is determined as will be described below.

The support housing 2 is formed in two parts, namely, a lower part 8 and an upper part 9 both of plastics material secured together by a plurality of rivets 10 along a seam 12 extending around the support housing 2. The support housing 2 is of substantially circular cross section and tapers in a generally upwardly direction from the seam 12. Protrusions 14 formed in the lower portion 8 of the support housing 2 extends sidewardly downwardly on opposite sides of the housing 2 and carry respective feet 15 for supporting the apparatus 1. An elongated handle 18 of tubular stainless steel for carrying the apparatus 1 extends substantially vertically and is secured by bracket members 20 and 22 of stainless steel. The bracket member 20 extends from the lower part 8 of the support housing 2, and is secured thereto by a pair of screws 21, and is welded to the handle 18 at a lower end 19. The bracket member 22 is described below. A third foot 23 extending downwardly from the handle 18 forms with the other two feet 15 a three point support for the apparatus 1. A portion 25 extends outwardly of and substantially vertically along the support housing 2 for carrying a scale means, namely, an elongated scale member 26 adjacent the measuring vessel 5 for determining the deviation of the volume of liquid. The scale member 26 is described in detail below.

The main vessel 4 is of stainless steel material of 0.9 mm wall thickness and comprises a main bulb 30 which defines a first hollow interior region 31 of relatively large volume for accommodating most of the liquid. A neck 32 also of stainless steel and seam welded to the main bulb 30 at 29 extends upwardly from the main bulb 30 and defines a throat 33 of constant circular transverse cross section which communicates with the first hollow interior region 31. The first hollow interior region 31 and the throat 33 form a main hollow interior region 34 of the main vessel 4.

The main bulb 30 is formed by a lower hemispherical portion 35 and an upper portion 36 of circular cross sectional area which tapers in a generally upstream direction towards the neck 32. Flanges 37 and 38 extending around the lower and upper portions 35 and 36, respectively, are secured together by a plurality of screws 39. The screws 39 also engage a flange 40 extending inwardly from the upper part 9 of the support housing 2 adjacent the seam 12 for securing the main vessel 4 in the support housing 2. An annular seal 41 extending between the flanges 37 and 38 seals the two portions 35 and 36 to provide a watertight first hollow interior region 31. The transverse cross sectional area of the throat 33 is considerably less than the maximum transverse cross sectional area of the first hollow interior region 31, namely, the transverse cross sectional area extending in a plane through the flange 37 of the lower hemispherical portion 35. This facilitates relatively accurate measuring of the deviation of the volume of liquid as will be described below.

The measuring vessel 5 for measuring the deviation of the volume of liquid in the apparatus i from the predetermined volume is formed by a vertically extending elongated tubular member 43 of extruded transparent nylon material. A mounting bracket 42 locates and secures a lower end 46 of the tubular member 43 to the bracket member 20. A longitudinally extending bore 44 of constant circular cross section of the tubular member 43 defines a secondary hollow interior region 45 for the liquid. The lower end 46 of the bore 44 is sealably closed by a secondary adjusting means, namely, an adjusting piston 47 for enabling the volume of the bore 44 to be varied, and in turn, the volume of the secondary hollow interior region 45. The operation and construction of the adjusting piston 47 is described in more detail below.

A communicating means, namely, a communicating tube 49 of stainless steel communicates the secondary hollow interior region 45 with the main hollow interior region 34. The communicating tube 49 extends from an upper end 50 of the measuring vessel 5 to the neck 32 of the main vessel 4. The communicating tube 49 extends into the throat 33, and terminates in a communicating opening 52 which lies in a substantially vertical plane in the throat 33 adjacent the neck 32. The communicating opening 52 is defined by a rim 53, the lower portion of which forms a weir 55 over which liquid passes from the main hollow interior region 34 into the secondary hollow interior region 45. As will be described below, the weir 55 is located at a position in the throat 33 so that a known volume of liquid, the volume of which is discussed below, is retained in the main hollow interior region 34 of the main vessel 4 by the weir 55.

Inhibiting means for selectively inhibiting the passage of liquid into the secondary hollow interior region 45 during filling of liquid into the apparatus 1, and until the level of liquid in the main hollow interior region 34 at least reaches the weir 55, comprises a valve means, namely, a ball valve 56 of stainless steel which is located in the communicating tube 49 relatively close to the communicating opening 52. Operating means, namely, an operating handle 57 extends from the ball valve 56 for manually operating the ball valve 56 between a closed position with the secondary hollow interior region 45 isolated from the main hollow interior region 34 and an open position with the main and secondary hollow interior regions 34 and 45, respectively, communicating.

The mounting bracket 22 is secured to an upper end 60 of the handle 18 by a screw 62 and is welded to the communicating tube 49 by a nut 63.

The scale member 26 is secured by rivets 65 to the portion 25 of the support housing 2, and extends along and adjacent the measuring vessel 5 for enabling the level of the meniscus of the liquid in the bore 44 to be determined, for, in turn determining the deviation of volume of the liquid in the apparatus 1 from the determined volume. A plurality of main graduations 66a and 66b are provided on the scale member 26 at equi-spaced intervals and extend upwardly and downwardly, respectively, from a datum graduation 67. The datum graduation 67 corresponds to the level of the meniscus of the liquid in the measuring vessel 5 which corresponds to the position at which the meniscus of the liquid should settle if the volume being measured is equal to the predetermined volume. The main graduations 66a above the datum graduation 67 indicate the extent to which the volume of liquid in the apparatus 1 exceeds or deviates above the predetermined volume, and the main graduations 66b below the datum graduations 67 indicate the extent to which the volume of liquid falls or deviates below the predetermined volume. Intermediate graduations 68 are provided halfway between the main graduations 66a and 66b.

Returning now to the measuring vessel 5, the adjusting piston 47 in the lower end 46 of the secondary hollow interior region 45 is of injection moulded plastics material. A pair of circumferentially extending grooves 83 accommodate two O-ring seals 84 for sealably engaging the piston 47 in the bore 44, see FIG. 7. A long shank screw 88 is engagable in a threaded bore 90 in the piston 47, and in a nut 91 secured to the bracket member 20, so that on rotation of the screw 88 in the nut 91, the position of the piston 47 in the bore 44 is varied. A lock nut 89 on the screw 88 locks the screw 88 when the piston 47 is in the desired location in the bore 44. The adjusting piston 47 is set in the bore 44 during calibration of the apparatus 1 so that the portion of the bore 44 between the lowest of the main graduations 66b, which in this case indicates a deviation of −100 ml from the predetermined volume and the top surface 94 of the piston 47 holds exactly 25 ml.

In this embodiment of the invention, the apparatus is sized to determine the deviation of a volume of liquid from a predetermined volume, which in this case is twenty liters. The main graduations 66a and 66b and the intermediate graduations 68 indicate the deviation in percentage amounts and in volume amounts from the predetermined volume. The main graduations 66a and 66b indicate a range of deviations from +1% to −0.5% from the predetermined volume, and in volume terms from +200 ml to −100 ml from the predetermined volume. Each main graduation 66a and 66b is arranged to indicate a 0.05% and a 10 ml deviation. Each intermediate graduation 68 measures 0.0254 deviation and 5 ml deviation.

Temperature compensating means for maintaining the volume of the main hollow interior region 34 of the main vessel 4 substantially constant over a range of temperatures comprises a variable volume body member 70 mounted in the main vessel 4. The body member 70 comprises an elongated bladder 71 of circular cross section formed by a thin cylindrical side wall 73 of a flexible, elastic material, namely, a synthetic rubber sold under the Trade Mark VITON of 0.5 mm thickness. Ends 74 and 75 of the bladder 71 are secured to the main vessel 4 by anchor hooks 76 of stainless steel welded to and extending from the main vessel 4 into the main hollow interior region 34. The bladder 71 defines a hollow interior region 77 which is completely filled with a heat expandable fluid, which in this embodiment of the invention is liquid alcohol. The ends 74 and 75 of the bladder 71 are sealed by a pair of clamping plates 78 and 79 secured by rivets 80. An eye opening 81 in each clamping plate 78 engages the corresponding anchor hook 76. The thickness of the synthetic rubber material of the side wall 73 and its modulus of elasticity are chosen so that the bladder 71 does not act as a constraint to the free volumetric expansion and contraction of the alcohol in response to temperature change. In other words, the alcohol in the bladder 71 is free to expand and contract in response to temperature change as though the alcohol were in free air. Additionally, the volumetric temperature co-efficient of expansion of the synthetic rubber material of the bladder 71 is significantly smaller than the volumetric temperature co-efficient of expansion of the alcohol, and since the side wall 73 of the bladder 71 is relatively thin, the expansion and contraction of the bladder 71 itself due to temperature change may be ignored. The shape of the body member 70 is chosen to optimize the transfer of heat to and from the liquid alcohol to optimize the temperature response time of the body member 70. The size, shape and outer volume of the bladder 71 is chosen taking account of the volumetric temperature co-efficient of expansion of the alcohol, so that the change in volume of the bladder 71 resulting from the change in volume of the liquid alcohol for each unit temperature change is substantially similar to the change in volume for each unit temperature change of the volume of the main hollow interior region 34 up to the level of the weir 55.

As discussed above, the apparatus 1 is for determining the deviation of a volume of liquid from a predetermined volume of twenty liters. The volume of the main hollow interior region 34 of the main vessel 4 up to the level of the weir 55 is chosen to accommodate the volume of the variable volume body member 70 and the fact that the measuring vessel 5 accommodates 125 ml of liquid up to the datum or zero graduation 67 on the scale member 26. Therefore, the formula for deriving the outer volume v of the bladder 71 is as follows:

$$(20{,}000 - 125 + v) \times 0.48 \times 10^{-4} = v \times 11.8 \times 10^{-4} \, v = 843 \text{ ml}$$

The volumetric expansion of stainless steel (material of the main vessel 4) $= 0.48 \times 10^{-4}$ per degree C.

Volumetric expansion of liquid alcohol $= 11.8 \times 10^{-4}$ per degree C.

Accordingly, to accommodate the bladder 71, the volume of the main hollow interior region 34 of the main vessel 4 up to the level of the weir 55 is approximately 20,843 ml. A small additional allowance in volume to the main hollow interior region 34 is required to accommodate the anchor hooks 76 and clamping plates 78 and 79. For each 1° C. temperature change, the volume of the main hollow interior region 34 up to the level of the weir 55 changes by 1 ml, which is identical to the change of the outer volume of the bladder 71 for each 1° C. temperature change. Accordingly, the variable volume body member 70 compensates fully for the change in volume of the main hollow interior region 34 up to the level of the weir 55 caused by each unit change in temperature.

In this embodiment of the invention, the maximum transverse cross sectional area of the main vessel 4 in the plane containing the flange 37 is 38,000 mm$^2$. The transverse cross sectional area of the throat 33 is 1,800 mm$^2$. The transverse cross sectional area of the bore 44 of the measuring vessel 5 is 500 mm$^2$. Accordingly, the transverse cross sectional area of the throat 33 is considerably less than the maximum transverse cross sectional area of the main hollow interior region 34 of the main vessel 4, and accordingly, since the main vessel 4 and measuring vessel 5 communicate in the throat 33, the accuracy of the apparatus 1 is relatively high. Since the transverse cross sectional area of the bore 44 of the measuring vessel 5 is relatively small, and considerably smaller than that of the throat 33 and, in particular, is very considerably smaller than the maximum transverse cross sectional area of the main hollow interior region 34, a relatively accurate reading of deviation can be obtained. This is because a relatively small deviation from the predetermined volume results in a relatively large change in the height of the meniscus of the liquid in the bore 44. In this particular embodiment of the invention, since the cross sectional area of the bore 44 is 500 mm$^2$, each 1 ml of deviation in volume corresponds to a length of 2 mm on the scale member 26.

A closure cap 95 is provided for closing the neck 32 when the apparatus 1 is not in use to avoid any danger of foreign bodies falling into the main vessel 4 or the escape of vapor therefrom.

In use, the apparatus 1 is initially calibrated. Once calibrated, no further calibration should be required unless the apparatus 1 is damaged. The apparatus is calibrated as follows. The ball valve 56 is closed. The apparatus 1 is placed in a controlled environment, the temperature of which is 20° C., and levelled. In other words, the apparatus is arranged with the measuring vessel 5 and the neck 32 extending vertically. A calibration volume of liquid, in this case, water or odorless kerosene is poured into the main vessel 4. The volume of the calibration volume of liquid is exactly 20 liters. The ball valve 56 is opened and the calibration liquid above the weir 55 flows over the weir 55 into the measuring vessel 4. At this stage, there should be precisely 125 ml of calibration liquid in the bore 44. The position of the adjusting pistons 47 is adjusted upwardly or downwardly as the case may require in the bore 44 until the meniscus of the liquid in the bore 44 corresponds with the datum graduation 67. In this position, there should be 25 ml of calibration liquid between the top surface 94 of the piston 47 and the lowest main graduation 66b, namely, the −100 ml deviation graduation. The adjusting piston 47 is secured in position in the measuring vessel 5 by tightening the lock nut 89 against the nut 91. The calibration of the apparatus 1 is thus completed, and with the valve 56 open the calibration liquid is emptied from the main vessel 4 and the measuring vessel 5.

The apparatus is now ready for use.

Where it is desired to determine the deviation in volume of a volume of liquid from a predetermined volume, the ball valve 56 is first closed. The volume of liquid is delivered into the main vessel 3, through the throat 33. By virtue of the fact that the ball valve 56 is closed, there is no danger of liquid splashing into the measuring vessel 5 while the liquid is being poured through the throat 33. It will be appreciated that liquid splash into the measuring vessel 5 during pouring could result in an inaccurate measurement should the deviation in volume of the liquid being measured be greater than 125 ml below the predetermined volume. On all the liquid having been poured into the main vessel 4, the ball valve 56 is opened, and liquid above the weir 55 flows over the weir 55 in the measuring vessel 5. The level of the meniscus of the liquid in the bore 44 of the measuring vessel 5 is read against the scale member 26 to determine the deviation from the predetermined volume. A reading on the graduations 66a indicates the percentage amount and the volume amount by which the volume exceeds the predetermined volume, while a reading on the graduations 66b indicates the percentage amount and the volume amount by which the volume of liquid falls short of the predetermined volume.

After the reading has been taken, the liquid in the apparatus 1 is discharged by upending the apparatus 1. It is important that while the apparatus 1 is upended, the ball valve 56 should be in the open position for draining both the main vessel 4 and the measuring vessel 5. Once the apparatus 1 has been completely emptied of liquid, the apparatus 1 is then ready for use again.

The advantages of the apparatus i according to this embodiment of the invention are many. Firstly, the apparatus is of a relatively simple construction, which necessitates minimal operator skills for use, while at the same time producing relatively accurate results. Further, by virtue of the simple construction of the apparatus 1, the apparatus is relatively robust and virtually maintenance free and also simple to use. By virtue of the fact that the transverse cross sectional area of the bore 44 of the measuring vessel 5 is relatively small, and considerably smaller than the maximum transverse cross sectional area of the main hollow interior region 34 of the main vessel 4, a particularly accurate measurement of deviation of the volume of liquid from the predetermined volume is obtained. Furthermore, by virtue of the fact that the weir 55 over which the main vessel 4 and the measuring vessel 5 communicate is located in the throat 33 which is of cross sectional area substantially less than the maximum transverse cross sectional area of the main hollow interior region 34, accuracy in the results is further improved. Additionally, any discrepancies in the level of the apparatus during measuring, have a minimal affect on the resultant deviation measured.

A particularly important advantage of the invention is achieved by virtue of the provision of the temperature compensating means in the main vessel. By virtue of the fact that the change in volume of the variable volume body member 70 is substantially similar to the change in volume of the main hollow interior region 34 of the main vessel 4 for each unit change in temperature, the apparatus is accurate over a wide range of temperatures, and accordingly, the deviation of a volume of liquid from a predetermined volume may be determined over a wide range of temperatures without the need for making compensations for the temperature of the vessel and the temperature of the liquid being measured.

Referring now to FIGS. 10 to 19, there is illustrated apparatus according to another embodiment of the invention indicated generally by the reference numeral 101 also for determining the deviation of a volume of liquid from a predetermined volume. The apparatus 101 is also suitable for determining the volumetric metering accuracy of a metering pump, such as, for example, a petrol pump. The apparatus 101 comprises a main vessel 103 of stainless steel of 0.9 mm wall thickness for receiving the liquid. The main vessel 103 is formed by a lower main bulb 105 formed by a substantially spherical shell 106 which defines a first hollow interior region 107 of relatively large volume for accommodating most of the liquid. Portion 109 of the shell 106 forms a ground engaging base 110 for supporting the apparatus 101 in a substantially upright position as illustrated in FIGS. 11 to 13. Three ground engaging feet 111 extend downwardly from the base 110 for engaging the ground. A neck 112 extends upwardly from the spherical shell 106 and defines a throat 114 which communicates with the first hollow interior region 107 for delivering liquid into the first hollow interior region 107 and for emptying the liquid from the first hollow interior region 107. The first hollow interior region 107 and the throat 114 form a main hollow interior region 113 of the main vessel 103. The neck 112 defines three regions, namely, a lower region 115 extending upwardly from the shell 106, an intermediate region 116 extending upwardly from the lower region 115 and slightly offset therefrom, and an upper region 117 which terminates in an opening 119, and which is cranked to facilitate filling and emptying of the main vessel 103. The throat 114 in all regions 115, 116 and 117 is of circular transverse cross-section. As can be seen, the transverse cross-sectional area of the throat 114 in the intermediate region 116 is relatively small and considerably less than the maximum transverse cross-sectional area of the first hollow interior region 107 at 120.

A measuring vessel 122 for measuring the deviation of the volume of liquid in the apparatus 101 from the predetermined volume is formed by an elongated tubular member 123 of transparent plastics material which extends substantially vertically. A bore 124 of relatively small, constant, circular transverse cross-section extends longitudinally in the tubular member 123 and forms a secondary hollow interior region 121. A lower end 125 of the bore 124 of the tubular member 123 is sealably closed by a plug 126. The upper end 127 of the tubular member 123 extends into the throat 114 in the intermediate region 116 of the neck 112 through an opening 108, and forms a communicating means, namely, a communicating opening 128 for communicating the secondary hollow interior region 121 of the measuring vessel 122 with the main hollow interior region 113 of the main vessel 103. The upper end 127 of the tubular member 123 terminates in a rim 118 which defines the communicating opening 128. The rim 118 forms a weir means, namely, a weir 129 over which liquid passes from the main hollow interior region 113 into the secondary hollow interior region 121. The communicating opening 128 is located in the geometrical center of the transverse cross-sectional area of the throat 114 adjacent the opening 128 to minimize the need for levelling of the apparatus during measuring as will be described below.

Inhibiting means for selectively inhibiting the passage of liquid into the secondary hollow interior region 121 of the measuring vessel 122 until the volume of liquid to be measured has been completely delivered into the main hollow interior region 113 of the main vessel 103 is provided by a valve means comprising a solid cylindrical valving member 130. The valving member 130 terminates in a conical face 138 which co-operates with the rim 118 for closing the communicating opening 128. A spindle 131 carrying the valving member 130 extends through an opening 133 in the neck 112 and terminates in an operating means, namely, a knob 132 to facilitate external manual operation of the valving member 130. The valving member 130 is movable from a closed position illustrated in FIG. 13 sealably engaging the rim 118 of the tubular member 123 for closing the communicating opening 128, to an open position illustrated in FIG. 14 upwardly spaced apart from the rim 118 to permit flow of liquid over the weir 129 from the main vessel 103 into the measuring vessel 122. A housing 134 mounted in the opening 133 in the neck 112 slidably accommodates the spindle 131. A compression spring 135 is housed in the housing 134 and acts between an end wall 150 of the housing 134 and a flange 151 rigidly mounted on and extending around the spindle 131 for urging the valving member 130 into the closed position.

A sleeve 136 extending downwardly from the intermediate region 116 of the neck 112 around the opening sealably engages and slidably accommodates the tubular member 123 so that the tubular member 123 can be moved in an upward and downward direction, namely, in the direction of the arrows A and B for calibration of the apparatus 101. By moving the tubular member 123 in the direction of the arrows A and B, the vertical position of the weir 129 in the throat 114 is varied, and thus, the volume of the main hollow interior region 113 of the main vessel 103 up to the level of the weir 129 is varied. A jubilee clip 137 around the sleeve 136 permits the tubular member 123 to be clamped in the sleeve 136 with the weir 129 in the desired vertical position after calibration. A bracket 139 mounted on the shell 106 locates and secures the end 125 of the tubular member 123.

Scale means comprising an elongated scale member 140 extends longitudinally along both sides of the tubular member 123 for enabling the level of the meniscus of the liquid in the measuring vessel 122 to be determined for in turn, determining the deviation of the volume of liquid in the apparatus 101 from the predetermined volume. The scale member 140 is secured at its lower end to the bracket 139, and is secured at its upper end by a bracket 141 secured to the sleeve 136. Screws (not shown) adjustably secure the scale member 140 to the brackets 139 and 141 to facilitate calibration of the apparatus as will be described below. A plurality of main graduations 142a and 142b are provided on both sides at equi-spaced intervals on the scale member 114 and extend upwardly and downwardly from a datum graduation 143. The datum graduation 143 corresponds to the level of the meniscus of liquid in the measuring vessel 122 when the volume of the liquid is equal to the predetermined volume. The main graduations 142a above the datum graduation 143 indicate the extent to which the volume of liquid in the apparatus 101 exceeds or deviates above the predetermined volume, while the main graduations 142b below the datum graduation 143 indicate the extent to which the volume of liquid falls or deviates below the predetermined volume. Intermediate graduations 144 are provided halfway between the main graduations 142a and 142b.

In this embodiment of the invention, the apparatus is sized to determine the deviation of a volume of liquid from a predetermined volume, the volume of which is 10 liters. The main graduations 142a and 142b and the intermediate graduations 144 indicate the deviation in percentage amounts and in volume amounts from the predetermined volume. The main graduations 142a and 142b indicate a range of deviations from +1% to −0.54 deviation from the predetermined volume, and in volume terms from +100 ml to −50 ml from the predetermined volume. Each main graduation 142a and 142b is arranged to indicate a 0.05% and a 5 ml deviation. The main graduation 142b corresponding to −0.54 and −50 ml deviation coincides with a top surface 145 of the plug 126. Each intermediate graduation 144 measures 0.0254 deviation and 2.5 ml.

Temperature compensating means for maintaining the volume of the main hollow interior region 113 of the main vessel 103 substantially constant over a range of temperatures comprises a variable volume body member 155 formed by an elongated sealed hollow body member 156 filled with a heat expandable fluid mounted in the first hollow interior region 107 of the main vessel 103. In this embodiment of the invention the heat expandable fluid is liquid alcohol. The body member 156 is of circular transverse cross-section and is of sheet stainless steel of wall thickness 0.5 mm. The body member 156 comprises a pair of spaced apart end walls 157 and 158 joined by a cylindrical side wall 159 which together with the end walls 157 and 158 define a closed hollow interior region 160 which is completely filled with the liquid alcohol. A mounting member 162 extending from the end wall 157 secures the body member 156 to the shell 106 of the main vessel 103. The side wall 159 is of concertina construction so that the body member 156 does not act as a constraint to the free volumetric expansion and contraction of the alcohol in response to temperature change. In other words, the alcohol is free to expand and contract as though the alcohol were in free air. Additionally, the volumetric temperature co-efficient of expansion of stainless steel is significantly smaller than the volumetric temperature co-efficient of expansion of the alcohol, and since the body member 156 is of relatively thin wall stainless steel, the expansion and contraction of the body member itself due to temperature change may be ignored. The size, shape and outer volume of the body member 156 is chosen taking account of the volumetric temperature co-efficient of expansion of the alcohol so that the change in volume of the body member 156 resulting from the change in volume of the liquid alcohol for each unit temperature change is substantially similar to the change in volume for each unit temperature change of the volume of the main hollow interior region 113 up to the level of the weir 129. Additionally, the shape of the body member 156 is chosen so that the outer surface area of the body member 156 is such as to optimize heat transfer to and from the liquid alcohol to optimize the temperature response time of the variable volume body member 155.

As discussed above, the apparatus 101 is for determining the deviation of a volume of liquid from a predetermined volume of ten liters. The volume of the main hollow interior region 113 of the main vessel 103 up to the level of the weir 129 is chosen to accommodate the volume of the variable volume body member 155 and the fact that the measuring vessel 122 accommodates 25 ml of liquid up to the datum or zero graduation 143 on the scale member 140. Therefore, the formula for deriving the outer volume v of the variable volume body member 155 is as follows:

$$(10{,}000-50+v) \times 0.48 \times 10^{-4} = v \times 11.8 \times 10^{-4} \quad v = 422 \text{ ml}$$

The volumetric expansion of stainless steel (material of the main vessel 103) = $0.48 \times 10^{-4}$ per degree C.

Volumetric expansion of liquid alcohol = $11.8 \times 10^{-4}$ per degree C.

Accordingly, to accommodate the variable volume body member 155, the volume of the main hollow interior region 113 of the main vessel 103 up to the level of the weir 129 is approximately 10,422 ml. A small additional allowance in volume to the main hollow interior region 113 is required to accommodate the mounting member 162 of the variable volume body member 155. For each 1° C. temperature change, the volumes of the main hollow interior region to the weir 129 and the body member 156 both change 0.5 ml. Therefore, the variable volume body member 155 fully compensates for the change in volume of the main hollow interior region 113 up to the level of the weir 129 caused by each unit change in temperature over a wide range of temperatures and certainly over a range of temperatures from −5° C. to +35° C. An advantage of providing the body member 156 of a material similar to the material of the main vessel, in this case, stainless steel is that the rate of heat transfer from the petrol to the alcohol is substantially similar to the rate of heat transfer from the petrol to the main vessel 103. Accordingly, the rate of change of volume of the alcohol, and in turn the rate of change of the volume of the body member 156 is substantially similar to the rate of change of volume of the hollow interior region of the main vessel 103. Thus, the change in volume of the main hollow interior region 113 of the main vessel 103 is relatively instantaneously compensated for by the change in volume of the variable volume body member 155.

In this embodiment of the invention, the maximum transverse cross sectional area of the main vessel 103 across the central plane of the spherical portion of the lower main bulb 105 is 42,000 mm². The transverse cross sectional area of the throat 114 in the neck region 116 adjacent the weir 129 is 700 mm². The transverse cross sectional area of the bore 124 of the measuring vessel 122 is 100 mm². Accordingly, the transverse cross sectional area of the throat 114 adjacent the weir 129 is considerably less than the maximum transverse cross sectional area of the main hollow interior region 113 of the main vessel 103, and accordingly, since the main vessel 103 and the measuring vessel 122 communicate through the communicating opening 128 which defines the weir 129, the accuracy of the apparatus 101 is relatively high. Since the transverse cross sectional area of the bore 124 of the measuring vessel 122 is relatively small, and considerably smaller than the throat 114 adjacent the weir 129, and in particular, the main vessel 104, a relatively accurate reading of deviation can be obtained. This is because a relatively small deviation from the predetermined volume results in a relatively large change in the height of the meniscus of the liquid in the bore 124. In this particular embodiment of the invention, since the cross sectional area of the bore 124 is 100 mm², each 1 ml of deviation in volume corresponds to a length of 1 mm on the scale member 140. In other words, the intervals between adjacent main graduations 142a and 142b is 1 mm. The distance between the intermediate graduations 144 and their adjacent main graduations 142a and 142b is 0.5 mm.

A handle 146 of plastics material extends between the shell 106 and the upper region 117 of the neck 112 for carrying the apparatus 101.

In use, the apparatus 101 is initially calibrated. Once the apparatus 101 has been calibrated, no further calibration should be required unless the apparatus 101 is damaged. The apparatus 101 is calibrated using a two stage process as follows. The first stage of calibration requires accurate location of the position of the weir 129 in the throat 114. The tubular member 123 with the plug 126 sealably secured therein is inserted through the sleeve 136 into the throat 114 so that the weir 129 is well above the position which would retain a first calibration volume of liquid, which in this case is 9,950 ml. The first calibration volume of liquid is delivered into the main vessel 103. With the apparatus level, the tubular member 123 is slowly moved downwardly through the sleeve 136 until the calibration liquid in the main vessel 103 just commences to flow over the weir 129. The tubular member 123 is then clamped in the sleeve 136 by tightening the jubilee clip 137, and the calibration liquid is emptied from the apparatus 101. The housing 134 with the spindle 131 carrying the valving member 130 and the knob 132 mounted therein is inserted into and secured in the opening 133 of the neck 122. The second stage of the calibration process requires delivery of a second calibration volume of liquid into the main vessel 103, the volume of which is exactly the predetermined volume, which in this case is 10 liters. The second calibration volume is delivered into the main vessel 103 with the valving member 130 closing the communicating opening 128. On the second calibration quantity of liquid being fully delivered into the main vessel 103, up to above the level of the weir 129, the valving member 130 is moved into the open position by raising the knob 132 upwardly of the neck 112. The valving member 130 is retained in the open position until the volume of the second calibration liquid above the weir 129 has passed over the weir 129 into the measuring vessel 122. The valving member 130 may then be closed by releasing the knob 132. The apparatus should be level during this operation. The scale member 140 is longitudinally adjusted along the tubular member 123 until the datum graduation 143 coincides with the meniscus of the liquid in the bore 124. The scale 140 is then secured in position. The calibration liquid is discharged from the apparatus 101 and the apparatus 101 is then ready for use.

The volume of liquid, the deviation of which from a predetermined volume is to be determined is delivered into the main vessel 103. While the liquid is being delivered into the main vessel 103, the valving member 130 under the action of the compression spring 135 remains in the closed position, thus closing the communicating opening 128 to avoid splashing of liquid into the measuring vessel 122. It will be appreciated that splashing of liquid into the measuring vessel 122 during filling could result in an inaccurate measurement should the volume of liquid being delivered into the main vessel 103 fall below −0.54 of the predetermined volume. On the volume of liquid having been completely delivered into the main vessel 103, and with the apparatus substantially level, the valving member 130 is moved into the open position by raising the knob 132 upwardly relative to the neck 112, thus allowing liquid above the level of the weir 129 to pass over the weir 129 into the measuring vessel 122. After all liquid above the weir 129 has passed into the measuring vessel 122, the level of the meniscus in the measuring vessel 122 is read against the scale 140 to determine the deviation from the predetermined volume. A reading on the graduations 142a or the intermediate graduations 144 above the datum graduation 143 indicates the percentage amount and the volume amount by which the volume of the liquid exceeds or deviates above the predetermined volume. A reading on the main graduations 142b or the intermediate graduations 144 below the datum graduation 143 indicates the percentage amount and the volume by which the volume of the liquid falls or deviates below the predetermined volume.

After the reading has been taken, the liquid in the apparatus 101 is discharged by upending the apparatus. It is important while the apparatus 101 is upended that the valving member 130 should be moved into the open position for draining the measuring vessel 122. The apparatus 101 is then ready for use again.

The advantages of the apparatus 101 according to this embodiment of the invention are many, and are substantially similar to those achieved by the apparatus 1. However, in this embodiment of the invention, an additional advantage is achieved by virtue of the fact that the weir 129 is located in the geometrical center of the throat 114 and the fact that the communicating opening 128 which forms the weir 129 is relatively small by comparison to the cross sectional area of the throat 114. Because of these two features, the need to have the apparatus 101 completely level is avoided. In other words, it is not essential that the ground engaging base 110 of the main vessel 103 be supported on an absolutely level surface. Even if the apparatus 101 is not level, in other words, if the portion 116 of the neck 112 is not extending vertically upwardly, the fact that the communicating opening 128 is of relatively small cross sectional area, and in particular, is located in the geometrical center of the throat 114 will not affect the accuracy of the deviation determined from the scale member 140 of the apparatus 101. By virtue of the fact that the position of the weir 129 formed by the end of the tubular member 123 is adjustable in the throat 114 of the main vessel 103, calibration of the apparatus 101 is relatively easily achieved, and the tolerance to which the main vessel 103 should be manufactured is not exceedingly critical. Furthermore, by virtue of the fact that the scale member is adjustable relative to the measuring vessel, calibration of the apparatus is further facilitated.

Referring now to FIGS. 20 and 21, there is illustrated a temperature compensating means for use in apparatus according to another embodiment of the invention. In this case the apparatus is identical to the apparatus 101, the only difference being in the temperature compensating means. The temperature compensating means comprises a variable volume body member 170 formed by an elongated bladder 171 which is mounted within the first hollow interior region 107 of the main vessel 103. The bladder 171 is completely filled with a heat expandable fluid, namely, alcohol. The bladder 171 is of a flexible, elastic material namely synthetic rubber similar to that of the bladder 71 of the apparatus 1 and of wall thickness similar to that of the bladder 71. The bladder 171 comprises a cylindrical wall 173 closed at one end 174. The other end 175 is sealably secured to a circular disc 176 which in turn is mounted to the shell 106 of the main vessel 103 by a mounting member 178. A protective sleeve 180 or cage of circular cross-section extends around the bladder 171 and is mounted to the shell 106 and extends downwardly into the first hollow interior region 107. A plurality of openings 181 extend through the protective sleeve 180 for communicating the volume 182 between the sleeve 180 and the bladder 171 with the first hollow interior region 107. Slots 183 extending through the protective sleeve 180 adjacent the shell 106 prevent collection of air adjacent the top of the sleeve 180. Otherwise, the construction and use of the apparatus according to this embodiment of the invention is identical to the apparatus 1 described with reference to FIGS. 10 to 19.

Referring now to FIGS. 22 and 23 there is illustrated a portion of a neck 32 of apparatus according to another embodiment of the invention which is substantially similar to the apparatus 1 of FIGS. 1 to 9. The neck 32 defines a throat 33 similar to the throat 33 of the apparatus 1. In this embodiment of the invention, the communicating tube 249 for communicating the throat 33 with the hollow interior region 45 of the measuring vessel 5 terminates in a flange 250 in the throat 33 which is secured to the neck 32. A bore 251 in the communicating tube 249 terminates in a communicating opening 252 which communicates the main hollow interior region of the main vessel with the measuring vessel. Weir means, in this embodiment of the invention provided by a weir 255, extends transversely across the opening 252, and liquid passing from the main hollow interior region 34 into the secondary hollow interior region 45 passes over the weir 255. The weir 255 retains a known volume of liquid in the main hollow interior region which as discussed above is less than the predetermined volume.

Referring now to FIGS. 24 to 26, there is illustrated a variable volume body member 270 for use in apparatus according to a still further embodiment of the invention, which is substantially similar to the apparatus 1 of FIGS. 1 to 9. The variable volume body member 270 is substantially similar to the variable volume body member 70 of the apparatus 1 of FIGS. I to 9, with the exception that the transverse cross sectional area of the bladder 271 instead of being of circular cross section, is of substantially rectangular transverse cross section. As can be seen in FIG. 26, one of the transverse dimensions is considerably greater than the other perpendicular transverse dimension. In other words, the length 1 of the transverse cross section of the hollow interior region 177 is considerably greater than the breadth b. The height h of the hollow interior region 177 is considerably greater than both the length and the breadth, 1 and b, respectively. However, in certain cases, it is envisaged that the height h may not be all that much greater than the length 1, and in certain cases, it is envisaged that the height h and length 1 may be substantially equal. The material of the bladder 271 is similar to that of the bladder 71, and the hollow interior region 277 is completely filled with liquid alcohol. The clamping plates 278 and 279 are identical to the clamping plates 78 and 79 of the variable volume body member 70 of the apparatus 1.

While the transverse cross sectional area of the bore of the measuring vessel, namely, the bore of the secondary hollow interior region of the apparatus 1 of FIGS. 1 to 9 has been described as being 500 mm$^2$ in certain cases it is envisaged that the bore of the secondary hollow interior region of the secondary measuring vessel 5 may be 200 mm$^2$ in which case the measuring vessel 5 would be capable of measuring a deviation from the predetermined volume in the range of −60 ml to +60 ml, or a total deviation on either side of the datum of 120 ml, or any other variation thereof.

It is envisaged that the main vessel 103 of the apparatus 101 may be mounted within a protective housing to avoid damage and the like to the main vessel 103. Such a protective housing may be of plastics or other suitable material, and may, for example, be of injection moulded or rotationally moulded plastics material. In such cases, it is envisaged that the main vessel 103 would be mounted within the protective housing so that the walls of the main vessel 103 would be spaced apart from the walls of the protective housing. It is also envisaged that provision would be made in the protective housing to provide clear visual access to the measuring vessel and the scale, and additionally, it is envisaged that the knob 132 for operating the valving member 130 would extend through the protective housing. Indeed, one of the advantages of enclosing the main vessel in a protective housing is that the walls forming the main vessel may be of relatively thin gauge stainless steel material.

It is envisaged that a spirit level may be provided on the apparatus 1 and 101 to facilitate levelling of the apparatus, should this be desired. A spirit level may be provided in any suitable location, however, a typical location would be adjacent the necks of the respective apparatus. It is also envisaged in certain cases that either or both apparatus may be mounted so as to be self-levelling, for example, the main vessel may be gimbal mounted from a framework extending upwardly from a ground engaging base formed separately of the main vessel. Alternatively, the ground engaging base may be formed separately of the main vessel, and the main vessel may be mounted in the base member to be tiltable relative to the ground engaging base.

While the main vessels have been described as being of particular shapes and constructions, a main vessel of any other shape and construction may be provided. Needless to say, a measuring vessel of any other shape and construction besides being formed by a tubular member may also be provided. While it is preferable, it is not essential that the measuring vessel should be connected directly into the main vessel, the two vessels may be connected by any suitable connecting tube or other suitable communicating means.

While the inhibiting means for preventing passage of liquid into the measuring vessel has been described as being provided by a valve means, any other suitable inhibiting means may be provided. Indeed, in certain cases, it is envisaged that the inhibiting means may be provided by a splash cover or the like, which would prevent passage of liquid from the main vessel into the measuring vessel until the level of liquid in the main vessel reached the weir. This would avoid any danger of splashing of liquid into the measuring vessel during filling.

While the main vessel and measuring vessel have been described as being of particular sizes, the vessels may be of any other suitable or desired sizes and other relationships between the sizes of the two vessels may be provided. While it is desirable that the communicating opening communicating the measuring vessel with the main vessel should be in a throat of relatively small cross-section, this is not essential.

While the weir means has been described as being formed by the end of the tubular member defining the communicating opening, the weir means may be formed by any other means. For example, in certain cases, it is envisaged that the weir means may be formed by an opening through the side wall of the tubular member. Needless to say, other means of forming a weir means will be well known to those skilled in the art.

While the main vessel has been described as being of stainless steel, the main vessel may be of any other suitable material. Indeed, in certain cases, it is envisaged that the main vessel may be of a plastics material. However, where the main vessel is of a plastics material, it is preferable that the volumetric temperature co-efficient of expansion of the plastics material is relatively low, otherwise, the volume of the variable volume body member of the temperature compensating means will be relatively large. Additionally, it is envisaged that a disadvantage of providing the main vessel of a plastics material is the relatively low thermal conductivity of the plastics material. This would tend to retard the rate of change of volume with respect to time for a unit temperature change to which the main vessel is subjected. Further, while the measuring vessel has been described as being of a plastics material, the measuring vessel may be of any other suitable material, and in certain cases, it is envisaged that the measuring vessel may be of glass.

It is also envisaged in certain cases that it may not be necessary for the measuring vessel to be of a transparent, or indeed, a translucent material. For example, in certain cases, it is envisaged that scale means may be provided internally or externally of the measuring vessel for enabling the level of the meniscus of the liquid in the measuring vessel to be determined. Such scale means may be a float means, which would float on the liquid in the measuring vessel, and which would carry a member which would extend externally of the measuring vessel and may or may not carry a scale thereon. Alternatively, such scale means may comprise electronic, optical, ultra-sonic or the like transducers for determining the level of the meniscus of the liquid in the measuring vessel, and a suitable visual display would be provided for displaying the level of the meniscus of the liquid in the measuring vessel.

Needless to say, the transverse cross-sectional area of the throat, the measuring vessel, the hollow interior region of the main vessel and any other transverse cross-sectional areas may be of any other desired size and shape.

It will be appreciated that the main vessel and measuring vessels may be provided of any desired volume which is suitable for accommodating the volume of the predetermined volume from which deviation is to be measured.

The volume of the body member of the temperature compensating means will be chosen to match the volume of the hollow interior region of the main vessel from the formula $$(V+v-y) \times a = v \times b$$

where $V=$ volume of the main hollow interior region up to the level of the weir of the main vessel, $v=$ the outer volume of the body member of the temperature compensating means, $y=$ the volume of the secondary hollow interior region up to the datum or zero graduation, $a=$ volumetric temperature co-efficient of expansion of the material of the main vessel $b=$ volumetric temperature co-efficient of expansion of the heat expandable fluid in the body member of the temperature compensating means.

The volume of the measuring vessel will also vary depending on the amount of deviation to be measured.

While the apparatus has been described for measuring the deviation of a volume of liquid from a predetermined volume, it will be readily apparent to those skilled in the art that the apparatus may be used for measuring the actual volume of a liquid. While the scale means has been provided to indicate the deviation in percentage terms and volume terms in ml, the scale may be provided to show the deviation in any other systems of measurement. Needless to say, the scale may be adapted to suit any range of deviations to be measured.

While a particular construction of temperature compensating means has been described, any other suitable construction of temperature compensating means may be provided. It will of course be appreciated that other suitable heat expandable fluids may be used instead of alcohol, and in certain cases, it is envisaged that the heat expandable fluid may be a gas instead of a liquid. Further, it will be appreciated in certain cases that the variable volume body member may be provided by a solid block of heat expandable material.

While the apparatus has been described as comprising a main vessel and a measuring vessel, in certain cases, the apparatus may be provided with a single container, in which case, it is envisaged that scale means may be provided in the neck of the container or in any other suitable location in the container. In which case, the temperature compensating means would be provided in the interior region of the single container.

It is also envisaged that the invention may provide a single vessel the volume of which is substantially constant over a range of temperatures. In such cases, the temperature compensating means would be provided in the vessel, and generally, within a hollow interior region of the vessel.

We claim:

1. Apparatus for determining volume of a liquid, the apparatus (1,101) comprising:

a main vessel (4,103) having a main hollow interior region (34,113) for holding a predetermined volume of the liquid, a measuring vessel (5,122) having a secondary hollow interior region (45,121) for receiving and measuring a volume of the liquid received from the main hollow interior region (34,113), the secondary hollow interior region (45,121) being of transverse cross-sectional area smaller than the maximum transverse cross-sectional area of the main hollow interior region (34,113), a communicating means (49,123) for communicating the measuring vessel (5,122) with the main vessel (4,123), for accommodating the liquid from the main hollow interior region (34,113) to the secondary hollow interior region (45,121), a wear means being formed by the communicating means (49,123) over which the liquid passes from the main hollow interior region (34,113) to the secondary hollow interior region (45,121), the weir means (55,129) being positioned for retaining the predetermined volume of liquid in the main hollow interior region (34,113), and a scale means (26,140) cooperating With measuring vessel (5,122) for determining the volume of liquid in the apparatus (1,101), wherein an inhibiting means (56,130) is provided and co-operates with the communicating means (49,123) for selectively preventing passage of liquid into the secondary hollow interior region (45,121) of the measuring vessel (5,122).

2. Apparatus as claimed in claim 1 characterized in that the inhibiting means (56,130) comprises a valve means (56,130), the valve means (56,130) being operable between a closed position isolating the secondandary hollow interior region (45,121) from the main hollow interior region (34, 113) for preventing flow of liquid into the secondary hollow interior region (45,121), and an open position communicating the main and secondary hollow interior regions (34,45, 113,121).

3. Apparatus as claimed in claim 1 characterised in that an operating means (57,132) is provided for operating the inhibiting means (56,130) externally of the apparatus (1,101).

4. Apparatus as claimed in claim 1 characterised in that the main vessel (4,103) comprises a main bulb (30,105) defining a first hollow interior region (31,107) and an elongated nesk (32,112) extending from the main bulb (30,105) and defining an elongated throat (33,114) communicating with the first hollow interior region (31,107), the first hollow interior region (31,107) and the throat (33,114) forming the main hollow interior region (34,113), the communicating means (49,123) communicating with the throat (33,114).

5. Apparatus as claimed in any of claims 1 characterised in that the communicating means (49,123) defines a communicating opening (52,128) located in the throat (33,114).

6. Apparatus as claimed in claim 5 characterised in that the communicating opening (52,128) defines the weir means (55,129), and the inhibiting means (56, 130) co-operates with the communicating opening (49,123 123).

7. Apparatus as claimed claims 1 characterised in that the transverse cross sectional area of the throat (33,114) adjacent the communicating means (49,123) is considerably smaller than the maximum transverse cross sectional area of the main hollow interior region (31,107).

8. Apparatus as claimed in claims 1 characterised in that the ratio of the maximum transverse cross sectional area of the main hollow interior region (31,107) to the transverse cross sectional area of the throat (33,114) adjacent the communicating means (49,123) is at least 5:1.

9. Apparatus as claimed in any of claim 1 characterised in that the measuring vessel (5,122) comprises an elongated tubular member (43,123) defining a longitudinally extending bore (44,124) of substantially constant transverse cross sectional area which forms the secondary bellow interior region (45,121).

10. Apparatus as claimed in 1 characterised in that the scale means (26,140) is provided adjacent the measuring vessel (5,122) for determining the deviation of the volume of liquid being measured from a predetermined volume by comparing the level of the meniscus of the liquid in the measuring vessel (5,122) with the scale means (26,140).

11. Apparatus as claimed claim 1 characterised in that a secondary adjusting means (47) is provided for varying the volume of the secondary hollow interior region (45) for calibration of the apparatus (1).

* * * * *